(12) United States Patent
Morales et al.

(10) Patent No.: US 8,886,665 B2
(45) Date of Patent: Nov. 11, 2014

(54) SYSTEMS AND METHODS FOR ENHANCING MANAGEMENT EFFECTIVENESS

(76) Inventors: Jose Antonio Morales, Scarsdale, NY (US); Elizabeth Haas, Scarsdale, NY (US)

( * ) Notice: Subject to any disclaimer, the term of this patent is extended or adjusted under 35 U.S.C. 154(b) by 613 days.

(21) Appl. No.: 12/946,465

(22) Filed: Nov. 15, 2010

(65) Prior Publication Data

US 2011/0119635 A1    May 19, 2011

Related U.S. Application Data

(60) Provisional application No. 61/409,061, filed on Nov. 1, 2010, provisional application No. 61/261,039, filed on Nov. 13, 2009, provisional application No. 61/263,863, filed on Nov. 24, 2009.

(51) Int. Cl.
*G06F 17/30* (2006.01)
*G06Q 10/10* (2012.01)
*G06Q 10/06* (2012.01)

(52) U.S. Cl.
CPC .......... *G06Q 10/10* (2013.01); *G06F 17/30572* (2013.01); *G06Q 10/06* (2013.01)
USPC ........................................ 707/769

(58) Field of Classification Search
CPC .................... G06F 17/30572; G06F 17/30592; G06F 17/30873; G06F 17/30716; G06Q 10/06; G06Q 10/10; Y10S 707/99933
USPC ........................................................ 707/769
See application file for complete search history.

(56) References Cited

U.S. PATENT DOCUMENTS

| 2003/0071841 | A1 | 4/2003 | Laronge et al. |
| 2008/0065470 | A1 | 3/2008 | Nelmes et al. |
| 2009/0013281 | A1 | 1/2009 | Helfman |
| 2009/0144313 | A1 | 6/2009 | Hodge et al. |

OTHER PUBLICATIONS

International Search Report, dated Jan. 19, 2011 for PCT/US2010/56729.
Written Opinion of the International Searching Authority, dated Jan. 19, 2011 for PCT/US2010/56729.

*Primary Examiner* — Jorge A Casanova
(74) *Attorney, Agent, or Firm* — Amster, Rothstein & Ebenstein LLP

(57) ABSTRACT

Provided is a computerized system and method of organizing and navigating through a management system in a hierarchal visualization structure. The elements of the management system are represented in cells in the form of a periodic table. The elements are classified and organized into one or more sets of groups stored at a first hierarchal level. Each cell displays general identification information regarding an element stored at a second hierarchal level including a textual abbreviation representing the element. Details regarding each element stored at third hierarchal level are displayed when one of the cells is selected. More specific information regarding each detail stored at a fourth hierarchal level is displayed when a detail is selected.

23 Claims, 22 Drawing Sheets

FIG. 3 (Cont.)

| | | | | | | GC – GLOBAL CITIZENING |
|---|---|---|---|---|---|---|
| | | KT KNOW THY ME | MbO FOCUS ON RESULTS | EXC EXTRAORDINARY CONTRIBUTION | BT² BALANCE OF TODAY AND TOMORROW | |

| ED EFFECTIVE DECISION MAKING | Ju JUDGEMENT | IKTS INFORMATION TO KNOWLEDGE SHARING | EC₁ EFFECTIVE COMMUNICATION | PB₁ PLAN B | OI OUTSIDE INTERESTS | EG EXERCISING GENEROSITY | Bsr BALANCED SELF REFLECTION |
|---|---|---|---|---|---|---|---|
| IEC INTERNAL AND EXTERNAL COLLABORATION | BIA BUILT IN AGILITY | SI SISTEMATIC INNOVATION | PD² EFFECTIVE COMMUNICATION | SCC SATISFIED COMMITTED CUSTOMERS | EE ENGAGED EMPLOYEES | FNH₁ FIRST DO NO HARM | BT2 BALANCING TODAY'S PROFIT AND LEGACY |
| EC₂ EFFECTIVE COMMUNICATION | ACR ACCOUNTABILITY FOR RESULTS | TRS TARGET RESULTS SETTING | DE DISCIPLINED EXECUTION | EC ENGAGED COMMUNITY | FRI FINANCIAL PERFORMANCE FOR | BOG BALANCING ORGANIZATION AND THE GREATER | PSC PROACTIVE SOLUTION CREATION FOR |
| GOV GOVERNANCE WITH LONG-TERM VISION | ART ACTIONABLE REPORTING AND TRACKING OF | AB² ALLOCATION OF BEST RESOURCE TO THE BIGGEST | EPAL EFFECTIVE PARTNERSHIPS ALLIANCES | SR STRATEGIC RESULTS | PB₂ FINANCIAL PERFORMANCE FOR | PO TURNING SOCIETY PROBLEMS INTO OPPORTUNITIES | PPP PRIVATE PUBLIC PARTNERSHIP FOR SOLUTION |
| TPR TIMELY PURSUIT OF RESULTS | EC²B EFFECTIVE CONTROLS AND CHECKS & | KCD KNOWLEDGE BASED DECISION | EQL ENHANCED QUALITY OF LIVING | HCP HIGH LEVELS OF CITIZEN PARTICIPATION | HCC HIGH % OF CITIZEN CONTRIBUTORS | FNH₃ FIRST DO NO HARM | GA GLOBAL ALLIANCES WITH SHARED MISSION |
| CLPC COMMUNITY LINKAGES PROMOTION | GC GLOBAL COLLABORATION | RGR RESPECTFUL GLOBAL RELATIONSHIPS | HOP HIGH OPPORTUNITY POTENTIAL | PB₃ PLAN B | HCC | BPG₂ BALANCING PARTISAN POWER AND THE GREATER | BCG BALANCING COUNTRY SPECIFIC GOALS |
| EWR EARLY WARNING REPORTING | EC₃ EFFECTIVE COMMUNICATION | | | | | OOP ONGOING OPPURTUNITY POTENTIAL | |

309, 311, 313

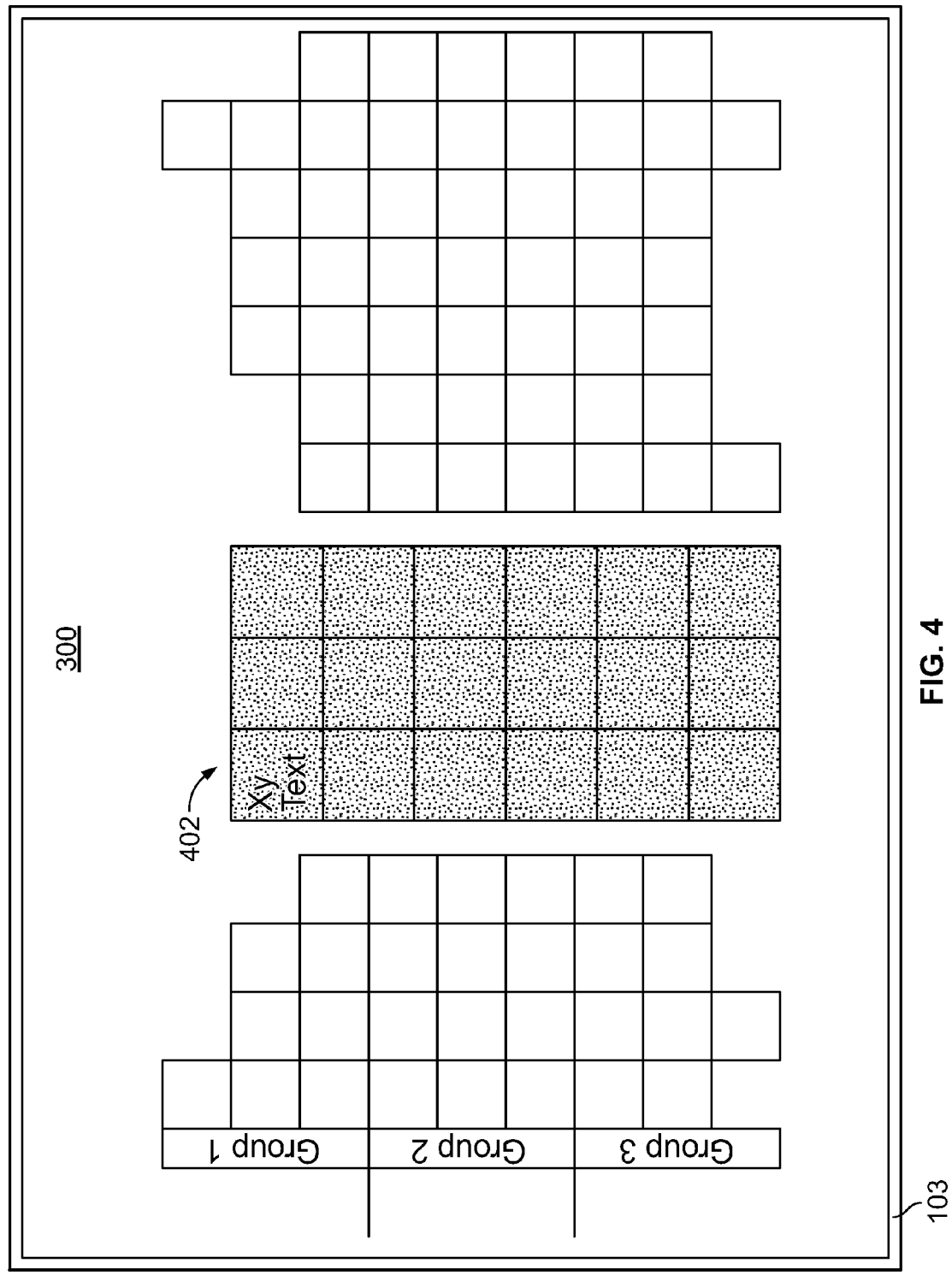

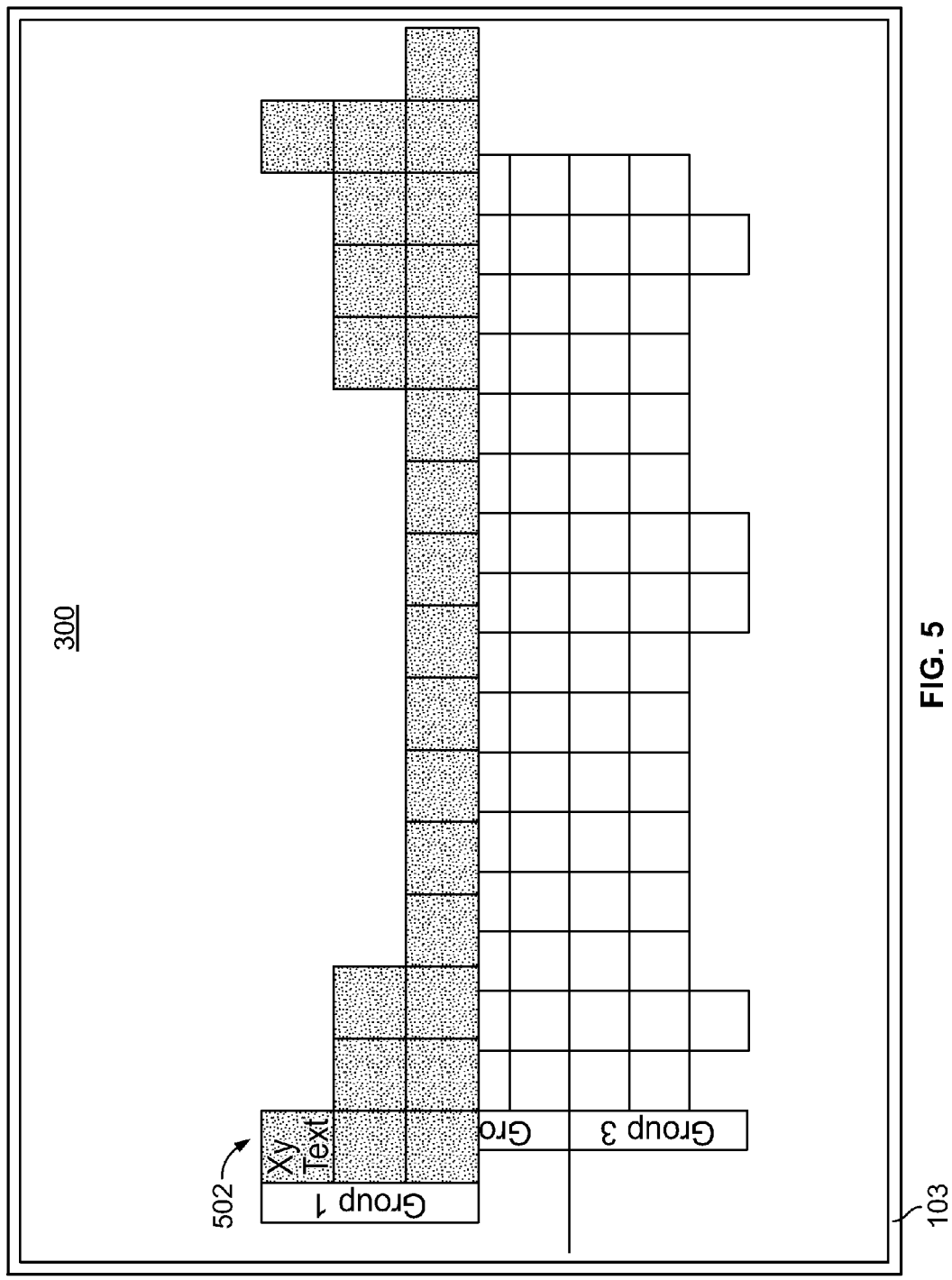

Management Effectiveness Enhancement Techniques

1102 → Example: Self-Managing Knowledge Worker, Enterprising Lens (Blue), Frequent Questioning (FQ)

Questioning As An SOP
Routine Questions

1. For the next 2 months, track the number of times you proactively ask questions:
   - During formal meetings
   - During informal interactions 2. Periodically, survey the following to gain their perspective on whether you routinely ask questions:
   - Customers
   - Direct reports
   - Bosses
   - People in other functions
   - External colleagues

High Quality Questions...

FIG. 11

Management Effectiveness Audit
Self-Managing Knowledge Worker Enterprising Lens (Blue)

Frequent Questioning (FQ)

1202 →

1. Frequency with which proactively solicits knowledge, opinion, ideas, and/or judgment from within the organization

- From those outside area of expertise/specialization:
  Often ☐   Rarely ☐   Never ☐

- From those within area of expertise/specialization:
  Often ☐   Rarely ☐   Never ☐

- From those at higher levels of management:
  Often ☐   Rarely ☐   Never ☐

- From those at lower levels of management:
  Often ☐   Rarely ☐   Never ☐

- Frequency with which proactively seeks knowledge, opinion, ideas, and/or judgment from outside the organization:
  Often ☐   Rarely ☐   Never ☐

SYSTEMS AND METHODS FOR ENHANCING MANAGEMENT EFFECTIVENESS

CROSS-REFERENCE TO RELATED APPLICATIONS

This application claims priority to U.S. Provisional Patent Application No. 61/261,039, filed Nov. 13, 2009, U.S. Provisional Patent Application No. 61/263,863, filed Nov. 24, 2009, and U.S. Provisional Patent Application No. 61/409,061, filed Nov. 1, 2010, the content of which are incorporated herein by reference in their entirety.

FIELD OF THE INVENTION

The present invention relates to systems and methods for enhancing management effectiveness, and more particularly, for organizing, user set sorting mechanisms, and navigating through a management system in a visualization structure, such as a hierarchal visualization structure.

SUMMARY OF THE INVENTION

In exemplary embodiments, the systems and methods can comprise storing, in processor readable memory(s) operatively connected to processor(s), database(s) that can comprise: (i) electronic source-content information that can comprise information that can represent at least some content information from at least one source, (ii) electronic source-element information that can comprise information that can represent at least one element, associated with at least some information from at least one source, and/or (iii) electronic source-hierarchal information that can comprise information that can represent hierarchal structure level(s), associated with element(s), associated, with at least some information from at least one source.

In exemplary embodiments, the systems and methods can further comprise associating, by processor(s), electronic source-content information, electronic source-element information, and/or electronic source-hierarchal information such that information can be transmitted in response to requests from a first higher hierarchal level and/or navigable to information at a lower hierarchal level. Further, the systems and methods can comprise receiving, via communication portal(s) operatively connected to processor(s), a first electronic request for information at the first hierarchal structure level from a computerized user system associated with the first user. Further still, the systems and methods can comprise determining, by processor(s), a first electronic response that can be at least responsive to the first electronic request for information at the first hierarchal structure level. Even further still, the systems and methods can comprise transmitting, via communication portal(s), the first electronic response to the computerized user system associated with the first user, the first electronic response (i) populating and/or (ii) generating a navigational hierarchal visualization structure that can be on a display of the computerized user system associated with the first user, constructed of (i) a plurality of elements associated with at least some electronic source-content, and/or (ii) a plurality of hierarchal structure levels associated with at least one of the plurality of element, associated, with at least some electronic source-content.

In exemplary embodiments, the first electronic response, transmitted via communication portal(s), can further comprise a plurality of groups arranged at the first hierarchal level.

In exemplary embodiments, the systems and methods can further comprise receiving, via communication portal(s) operatively connected to processor(s), a second electronic request for information at a second hierarchal structure level from the computerized user system associated with the first user. The systems and methods can further comprise determining, by processor(s), a second electronic response that can be at least responsive to the second electronic request for information at the second hierarchal structure level. And, can also include transmitting, via communication portal(s), the second electronic response to the computerized user system associated with the first user, the second electronic response including general identification information regarding the element) at a second hierarchal level.

In exemplary embodiments, the general identification information, transmitted via communication portal(s), can further comprise a textual symbol, abbreviation, full name, and/or brief description that can represent the element.

In exemplary embodiments, the systems and methods can further comprise receiving, via communication portal(s) operatively connected to processor(s), a third electronic request for information at a third hierarchal structure level from the computerized user system associated with the first user. The systems and methods can further comprise determining, by processor(s), a third electronic response that can be at least responsive to the third electronic request for information at the third hierarchal structure level. And, can also include transmitting, via communication portal(s), the third electronic response to the computerized user system associated with the first user, the third electronic response including general identification information regarding each element at the third hierarchal level.

In exemplary embodiments, the systems and methods can further comprise receiving, via communication portal(s) operatively connected to processor(s), a fourth electronic request for information at a fourth hierarchal structure level from the computerized user system associated with the first user. The systems and methods can further comprise determining, by processor(s), a fourth electronic response that can be at least responsive to the fourth electronic request for information at the fourth hierarchal structure level. And, can also include transmitting, via the at least one communication devices, the fourth electronic response to the computerized user system associated with the first user, the fourth electronic response including more specific information regarding each detail stored at a fourth hierarchal level.

In exemplary embodiments, the systems and methods can further comprise receiving, via communication portal(s) operatively connected to processor(s), a fifth electronic request for information at a fifth hierarchal structure level from the computerized user system associated with the first user. The systems and methods can further comprise determining, by processor(s), a fifth electronic response that can be at least responsive to the fifth electronic request for information at the fifth hierarchal structure level. And, can also include transmitting, via communication portal(s), the fifth electronic response to the computerized user system associated with the first user, the fifth electronic response including quotes, listings, practice tools, and/or self-auditing tools.

In exemplary embodiments, the systems and methods can further comprise receiving, via communication portal(s) operatively connected to processor(s), a fifth electronic request for information at a fifth hierarchal structure level from the computerized user system associated with the first user. The systems and methods can further comprise determining, by processor(s), a fifth electronic response that can be at least responsive to the fifth electronic request for information at the fifth hierarchal structure level. And, can also include transmitting, via communication portal(s), the fifth electronic response to the computerized user system associated with the first user, the fifth electronic response including more specific information.

In exemplary embodiments, the fifth electronic response, transmitted via communication portal(s), including more specific information can further comprise full text of quote or anecdote, publications, speeches, case studies, multimedia/video, sources, user generated content, user or editorial comments, social media links or widgets, links to other websites or blogs, practice techniques and/or exercises, and/or self-auditing tools.

In exemplary embodiments, the first electronic response, transmitted via communication portal(s), can further comprise grouping of elements at the first hierarchal level according to at least one metric. The information at the first hierarchal structure, transmitted via communication portal(s), can further comprise at least one metric that groups the elements within a set of categories of a management system. Also, the at least one metric at the first hierarchal structure, transmitted via communication portal(s), can group the elements (i) substantially along the visualizations structure's vertical axis, (ii) substantially along the visualizations structure's horizontal axis, and/or (iii) substantially irregularly along the visualizations structure's vertical and/or horizontal axis.

In exemplary embodiments, the categories of the management system at the first hierarchal structure, transmitted via communication portal(s), can further comprise key success factors and/or particular levels of society.

In exemplary embodiments, the navigational hierarchal visualization structure at the first hierarchal structure, transmitted via communication portal(s), can be shaped similar in fashion to Mendeleev's periodic table of the elements. Also, the visualization structure at the first hierarchal structure, transmitted via communication portal(s), can be arranged by rows and/or columns, irregular boundaries, and/or visual identifiers.

In exemplary embodiments, the navigational hierarchal visualization structure at the first hierarchal structure, transmitted via communication portal(s), can further comprise a practice support tool and/or a self-auditing support that can be (i) displayed, in at least one graphical user interface, and/or (ii) generated, on at least one physical medium. Also, the navigational hierarchal visualization structure at any of the hierarchal structures, transmitted via communication portal(s), can include an at least one navigational map for showing where and/or at what hierarchal level the user can be at. Further still, the navigational hierarchal visualization structure at any of the hierarchal structures, transmitted via communication portal(s), can further comprise information for enhancing management effectiveness.

In exemplary embodiments, the electronic source-content information can comprise information that can represent at least some content information from at least one source that can be obtained and/or affiliated passively by user input. Also, the electronic source-content information can comprise information that can represent at least some content information from at least one source that can be obtained actively by a computer implemented process. Further still, the electronic source-content information can comprise information that can represent at least some content information from at least one source that can be affiliated actively by a computer implemented process.

In exemplary embodiments, the electronic source-content information can comprise information that can represent at least some content information from at least one source can include a link to that source such as, but not limited to, hyperlinks/hypertext to a website, and hyperlinks/hypertext to articles, and/or any other form of link to a source.

BRIEF DESCRIPTION OF THE DRAWINGS

Exemplary embodiments of this invention will be described with reference to the accompanying figures.

FIGS. 4-5 illustrate a grouping of elements of the visualization structure at a first hierarchal level, according to exemplary embodiments of the present invention.

FIG. 11 illustrates a practice support tool at a fifth hierarchal level of an element, according to exemplary embodiments of the present invention.

FIG. 12 illustrates a self-auditing support tool at a fifth hierarchal level of an element, according to exemplary embodiments of the present invention.

DETAILED DESCRIPTION

The present invention generally relates to systems and methods for enhancing management effectiveness. The method, or at least some of the steps thereof, is implemented on and/or through at least one computerized system for organizing and navigating through a management system in a hierarchal visualization structure. The system provides for, amongst other things, the development of new techniques for enhancing management effectiveness, while also providing, for example, a visualization structure that can offer convenient access to and/or classification of new and existing management theories and techniques.

In exemplary embodiments, the visualization structure may be a management effectiveness map that, for example, denotes the fundamental elements of a management system. Further, each element can comprise information that identifies a piece of the perspective and/or way of thinking required for management effectiveness. Thus, when each of the elements are put together on the map, they can, for example, collectively constitute the common underpinning of management effectiveness, tailored as appropriate for self-management, organizational management, and management of society throughout the repeating cycle of vision, execution, and outcome of management.

Figure 1:
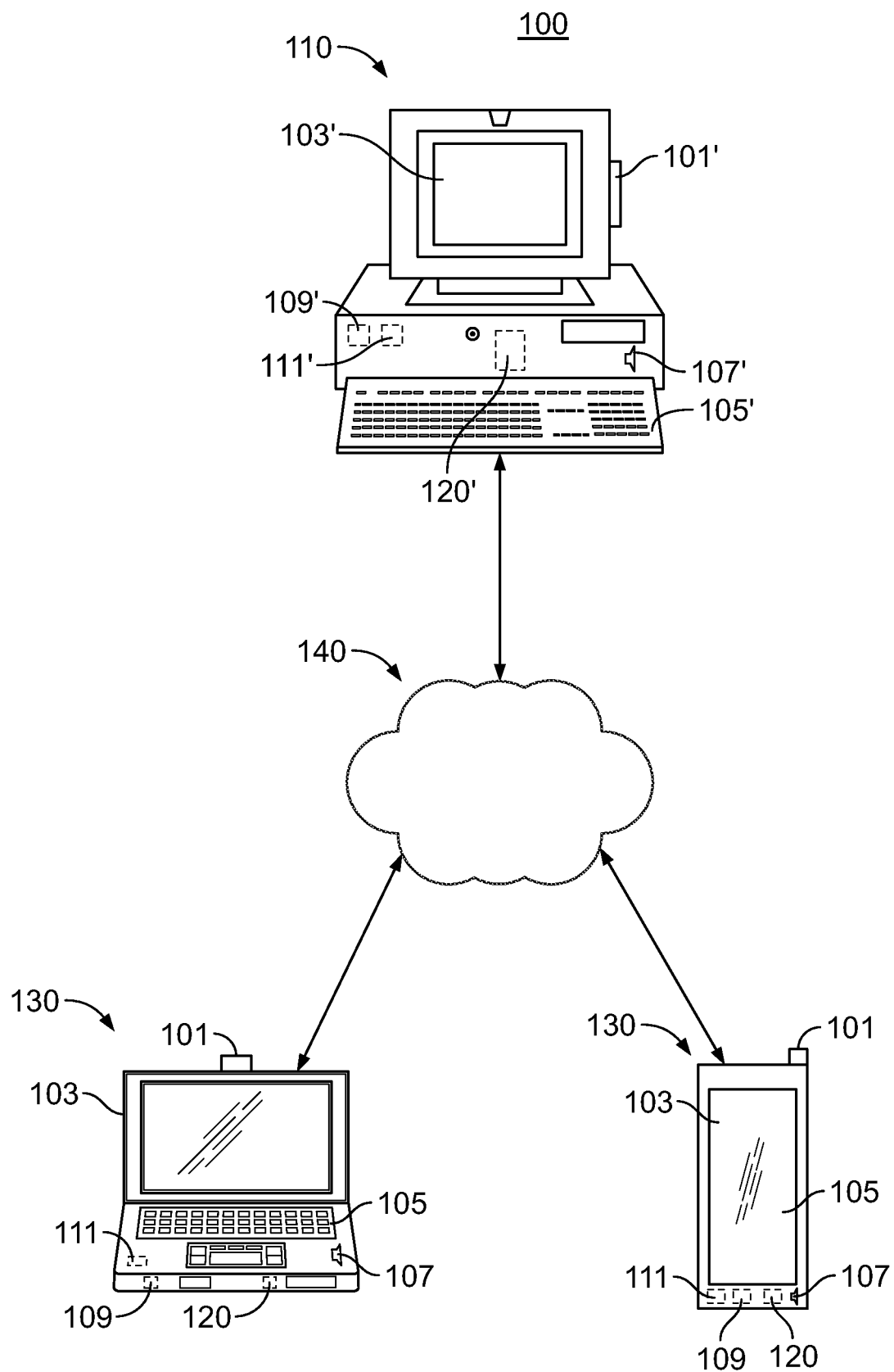
FIG. 1 is a diagram illustrating a computerized system for implementing the methods discussed herein, according to exemplary embodiments of the present invention.

Referring to FIG. 1, the method for organizing and navigating through a management system 100 in a hierarchal visualization structure, discussed in greater detail below, can be implemented on and/or through a computerized management system 110 and a computerized user system 130 that can communicate with each other, for example, via a network 140, and/or can be further combined and/or separated. For ease, the computerized management system 110 and the computerized user system 130 are at times, shown separately. This is merely for ease and is in no way meant to be a limitation.

As shown, the computerized management system 110 and the computerized user system 130 can include, but is not limited to, and at least one communication portal 101 and 101'; at least one graphical user interface 103 and 103'; at least one user input 105 and 105'; at least one speaker 107 and 107'; at least one processor readable memory 109 and 109'; at least one processor 111 and 111'; at least one database 120 and 120' stored in processor readable memory; and/or any other reasonable components for use in communicating, storing, and processing any form of information (e.g., data).

In some instances, the graphical user interface 103 and 103' and the user input 105 and 105' can be substantially the same. For example, the graphical user interface 103 and 103' and the user input 105 and 105' can be combined as a touch distribution system. The touch distribution system can be a display that can detect the presence and location of a touch within the distribution system area.

In exemplary embodiments, the computerized management system 110 and/or the computerized user system 130 can be, for example, a mobile phone, computer, tablet computer, iPad, iPod, iPhone, Smartphone, and blackberry, to name a few. In exemplary embodiments, the management system 110 and/or the computerized user system 130 can implement at least some, if not all, of the steps, methods, and/or techniques described herein and/or claimed steps, methods, and/or techniques. For example, the computerized management system 110 and/or the computerized user system 130 can implement at least some, if not all, of the steps, methods, and/or techniques described herein and/or claimed steps by accessing at least one algorithm, program, and/or process stored in the processor readable memory 109 and 109' and/or database 120 and 120' stored in processor readable memory, and processing the algorithm, program, and/or process, using the processor 111 and 111'. Even further still, in exemplary embodiments, at least some of the steps, methods, and/or techniques described herein and/or claimed steps can be required to be implemented by the computerized management system 110 and/or the computerized user system 130.

In exemplary embodiments, any of the elements of the computerized management system 110 and the computerized user system 130 such as, but not limited to, the at least one communication portal 101 and 101'; the at least one graphical user interface 103 and 103'; the at least one user input 105 and 105'; the at least one speaker 107 and 107'; the at least one processor readable memory 109 and 109'; the at least one processor 111 and 111'; the at least one database 120 and 120' stored in processor readable memory; and/or any other reasonable components for use in communicating, storing, and processing any form of information (e.g., data) can be operatively connected each other.

Figure 2A:
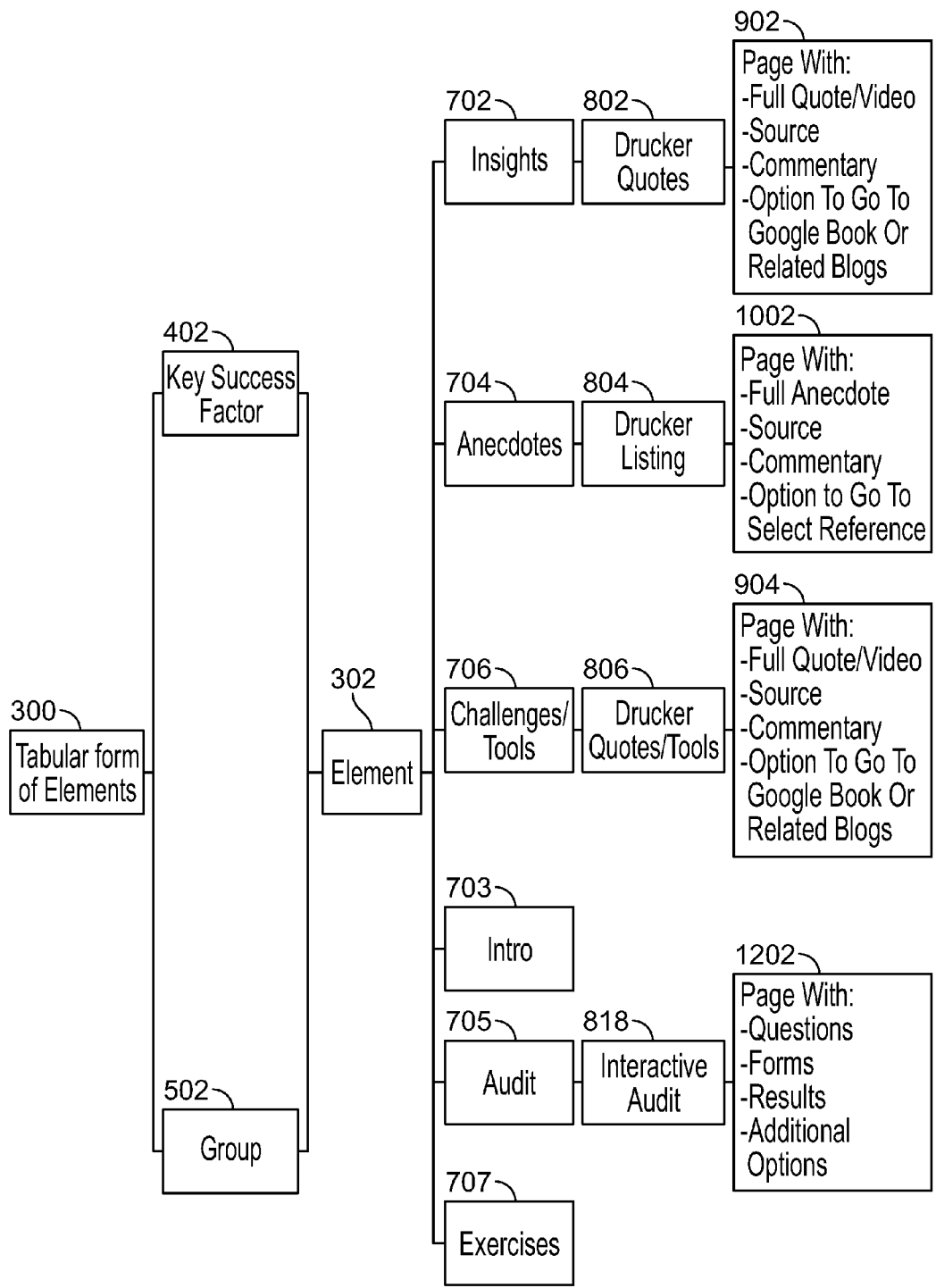
FIGS. 2A-2B are flow charts illustrating methods for organizing and navigating a hierarchal visualization structure of a management system, according to exemplary embodiments of the present invention.
Figure 2B:
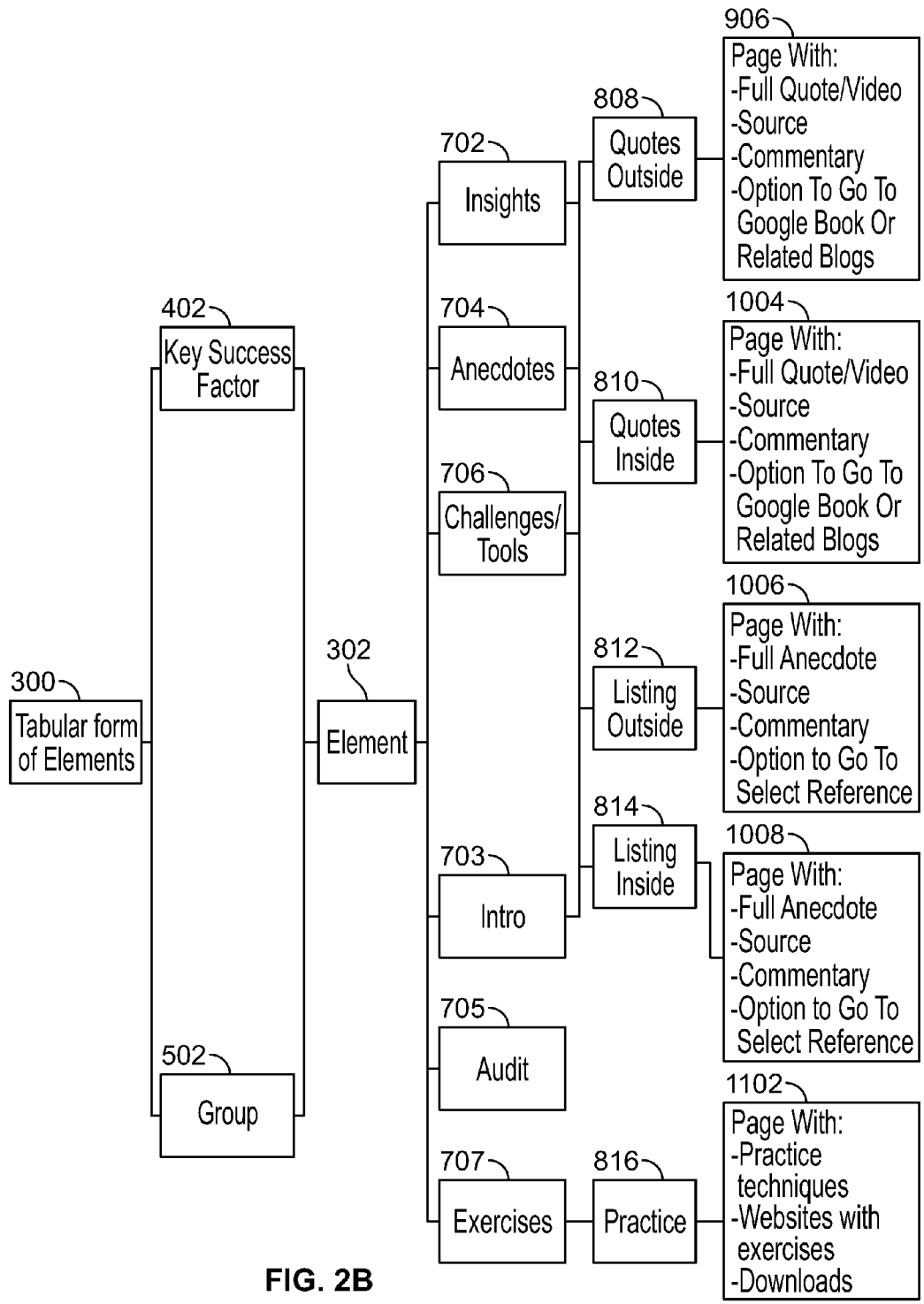

FIGS. 2A-2B illustrate flowcharts of methods for organizing and navigating a hierarchal visualization structure of a management system according to exemplary embodiments of the present invention.

Figure 3:
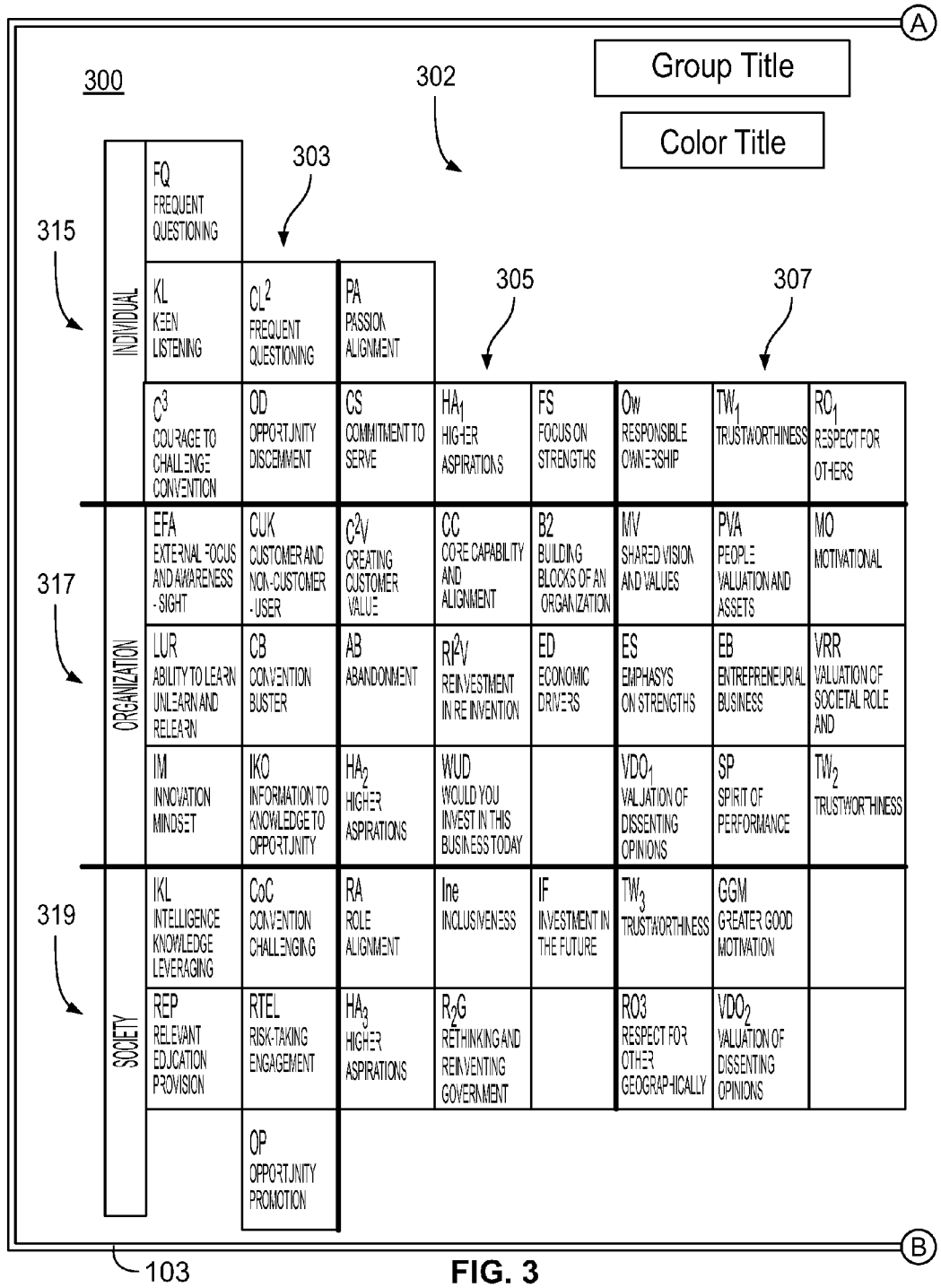
FIG. 3 illustrates a visualization structure constructed of elements of the management systems, according to exemplary embodiments of the present invention.

Referring to FIG. 3, the visualization structure may be a table 300 displaying the elements 302 of the management system, for example, in the graphical user interface 103 of the computerized user system and/or the computerized management system. The table 300 may be organized as a periodic table, for example, to allow trends to be seen when the elements 302 of the management system are organized in the table, in a similar fashion to Mendeleev's periodic table of the elements. In some embodiments, the table may be organized in other recognizable structures or patterns.

The elements 302 within the table 300 may be organized and/or displayed into one or more groups of cells according to one or more metrics at a first hierarchal level. According to exemplary embodiments as shown in FIGS. 3-5, the elements may be organized and/or displayed into first and second sets of groups 402, 502 according to first and second metrics, respectively, for example, in the graphical user interface 103 of the computerized user system and/or the computerized management system. The first set of groups 402 for the first metric, in these examples, are arranged based on the horizontal position of the elements 302 in the table 300, and the second set of groups 502 for the second metric are arranged based on the vertical position of the elements 302 in the table 300. However, it is intended that the elements 302 may be organized into any number of sets of groups.

In exemplary embodiments, metrics can be user defined mechanisms which the user can control. For example, although not shown, the elements 302 may be organized into any number of sets of groups, such as, but not limited to, authors, teaching areas, methodologies over varies time frames, company specific teachings, company specific priorities, any other combination thereof, and/or based on any other metric desired, defined, and/or controlled by a user. By way of example, if the user desires a visualization structure for enhancing management effectiveness based on management theories developed by an individual than the user can define and/or control metrics that associated with that individual. In exemplary embodiments, by defining the metrics, the user can prioritize how things are shown based on, for example, user interest Referring to FIG. 4, the elements may be organized into a first set of groups 402 for a first metric, with each group 402 including a block of cells representing elements falling within one of a first set of categories of the management system. The groups 402 may be separated at one or more locations at generally vertical boundaries between columns of cells along the horizontal axis of the table. However, the groups 402 may have irregular boundaries across two or more columns. The groups 402 also need not stretch across the entire table as otherwise shown in FIG. 4. Each group 402 may be colored or shaded in a different color or tone to identify the group. When a group 402 is selected, the group 402 may be highlighted, such as by fading the remainder of the table into the background, for example. In exemplary embodiments, the cells may be organized into colored or shaded groups 402 that include elements organized into particular key success factors defined by the management system.

Referring to FIG. 5, the elements may be organized into a second set of groups 502 for a second metric, with each group 502 including a block of cells representing elements falling within one of a second set of categories of the management system. The groups 502 may be separated at one or more locations between rows of cells at generally horizontal boundaries along the vertical axis of the table. However, the groups 502 may have irregular boundaries across two or more rows. The groups 502 also need not stretch across the entire table as otherwise shown in FIG. 5. When a group 502 is selected, the group 502 may be highlighted, such as by fading the remainder of the table into the background, for example. In exemplary embodiments, the cells may be organized into groups 502 that include the elements organized into particular levels of society as defined by the management system.

Figure 6A:
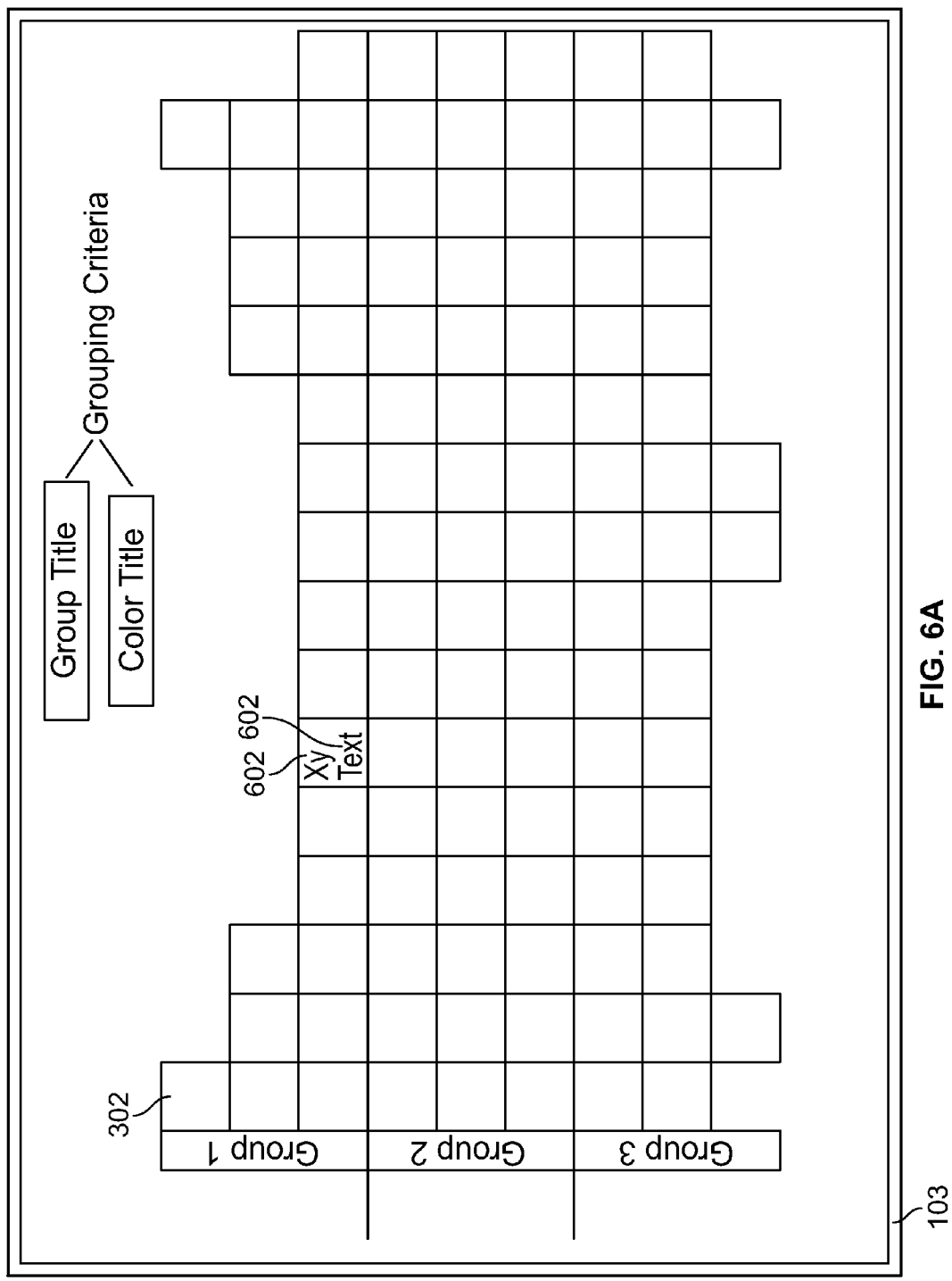
FIGS. 6A-6B illustrate elements within the visualization structure at a second hierarchal level, according to exemplary embodiments of the present invention.
Figure 6B:
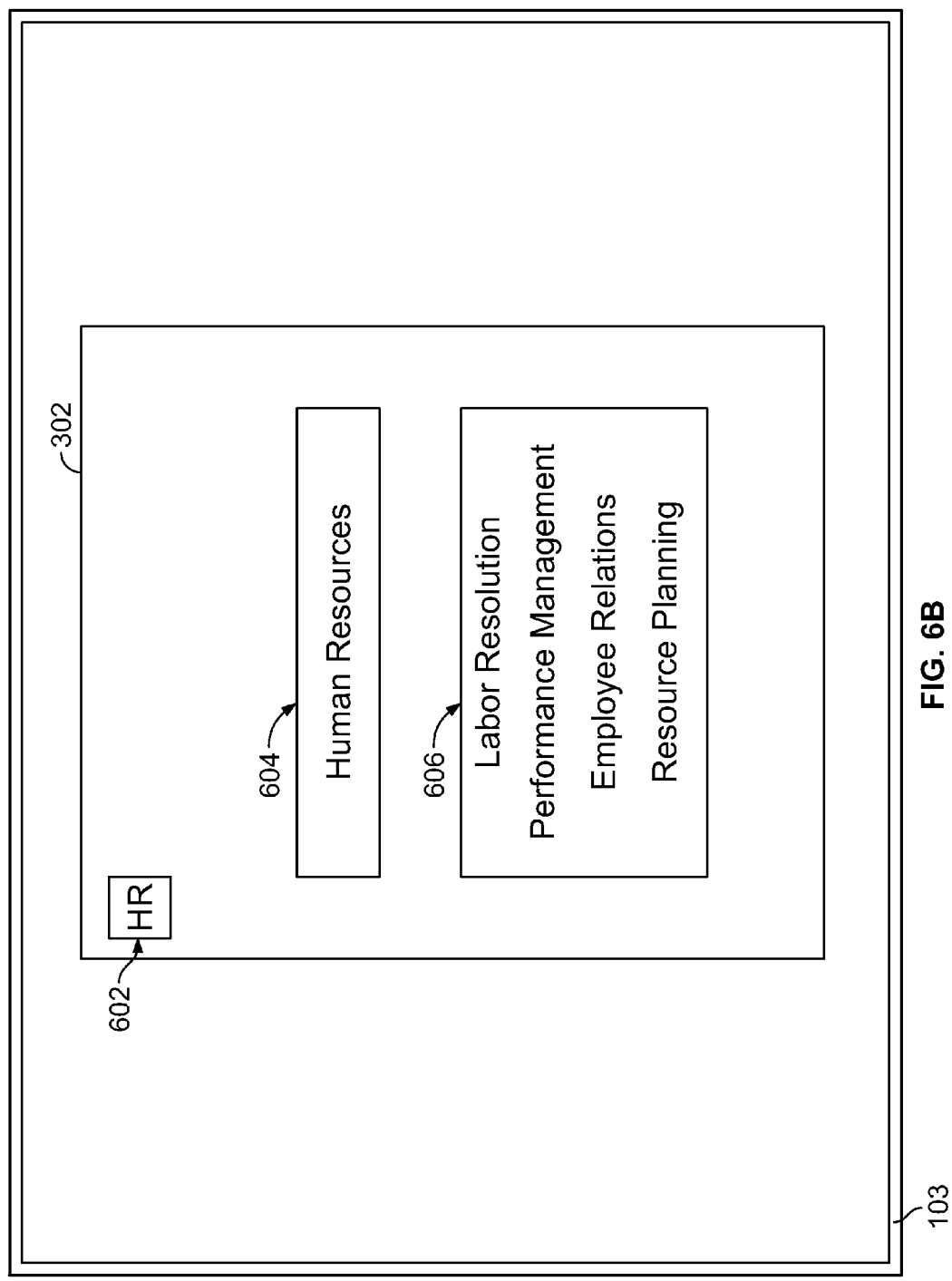

Referring to FIGS. 6A-6B, the individual cells within the table 300 may represent the various elements 302 of the management system that can be displayed, for example, in the graphical user interface 103 of the computerized user system and/or the computerized management system. Each cell may include general identification information regarding the elements at a second hierarchal level, such as a textual symbol or abbreviation 602 that represents the element 302, a full name 604 of the element 302, and/or a brief representative description 606 of the element 302.

Figure 7:
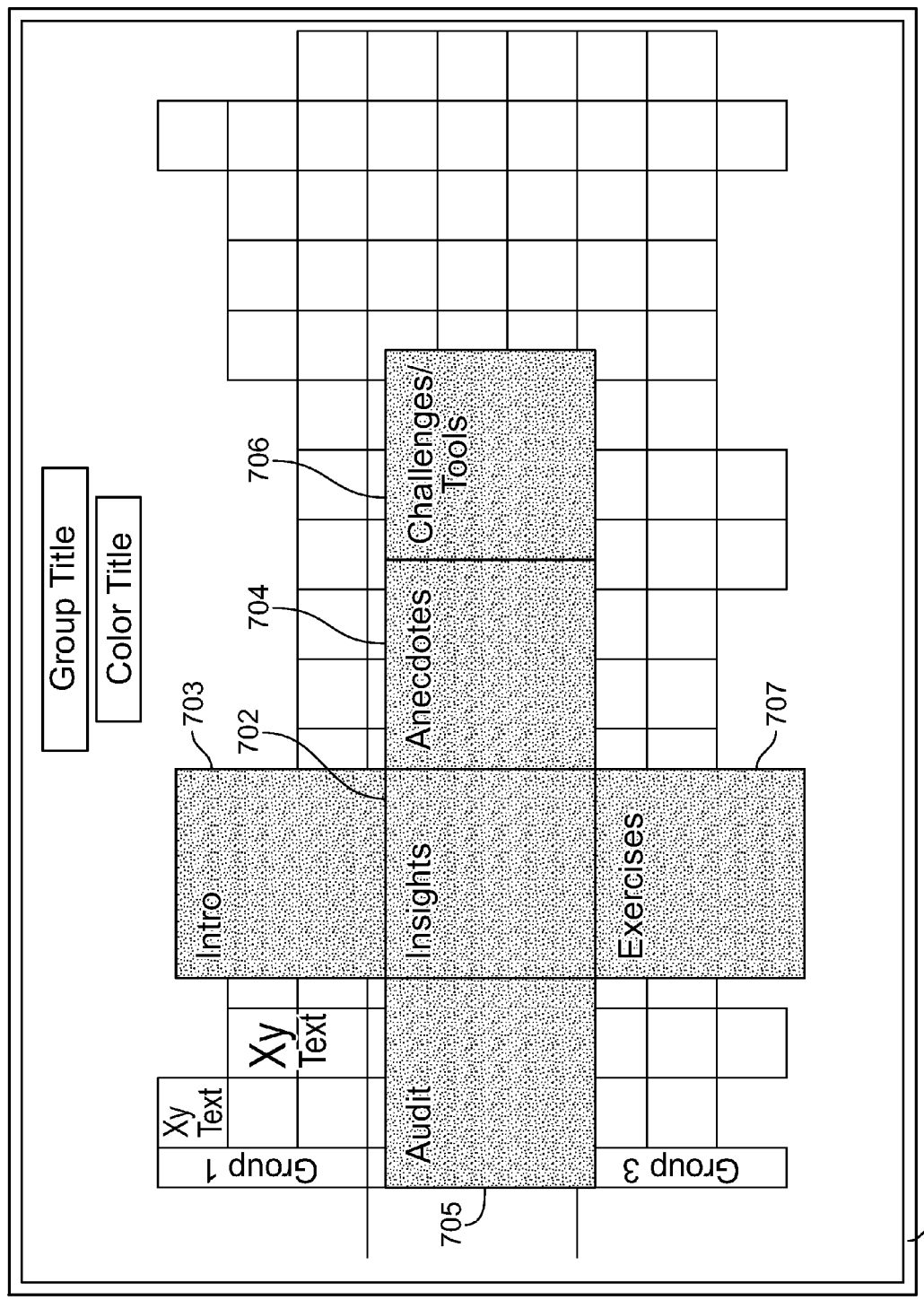
FIG. 7 illustrates detailed information for an element at a third hierarchal level, according to exemplary embodiments of the present invention.
Figure 8:
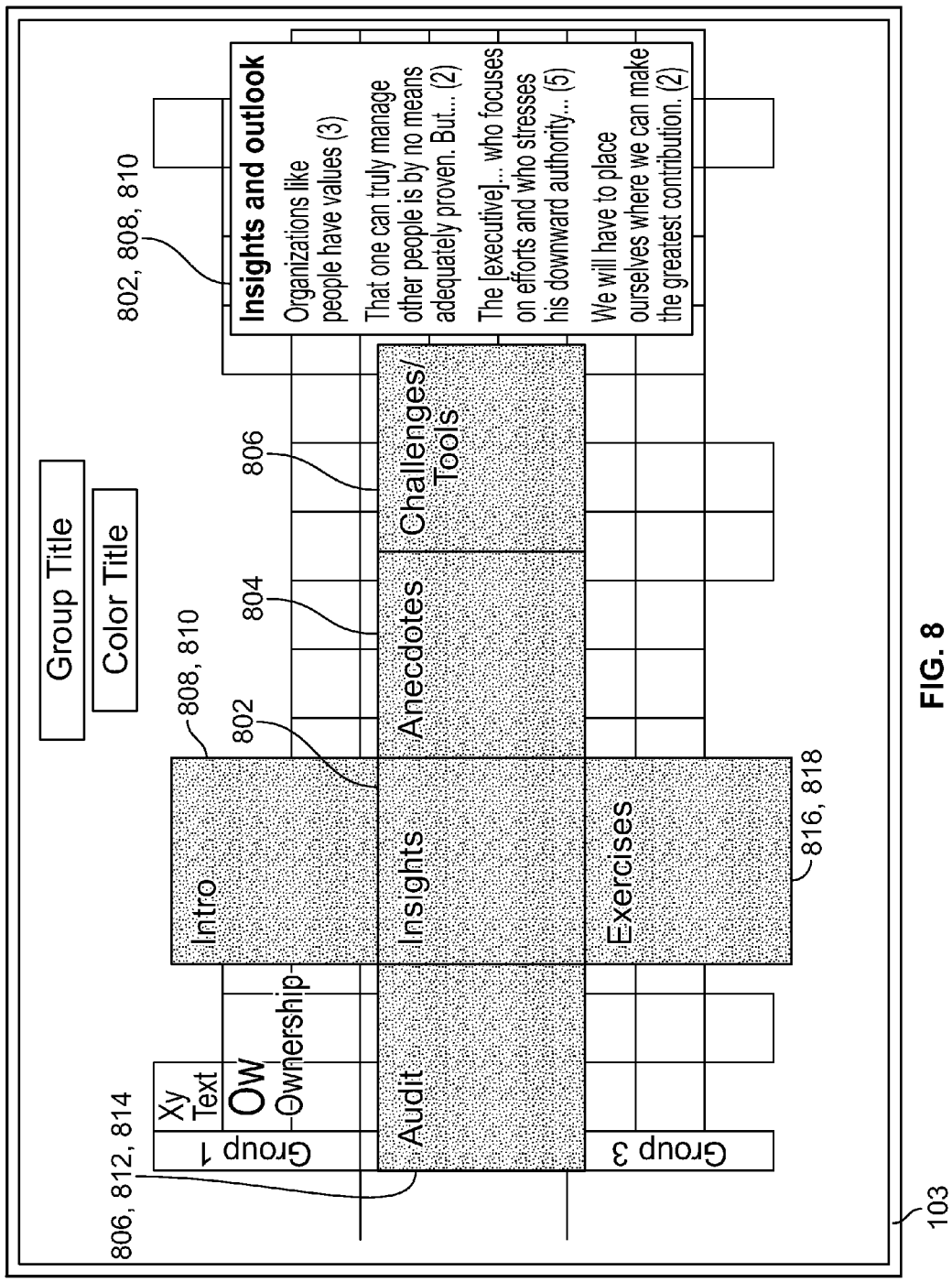
FIG. 8 illustrates more specific information for an element at a fourth hierarchal level, according to exemplary embodiments of the present invention.
Figure 9:
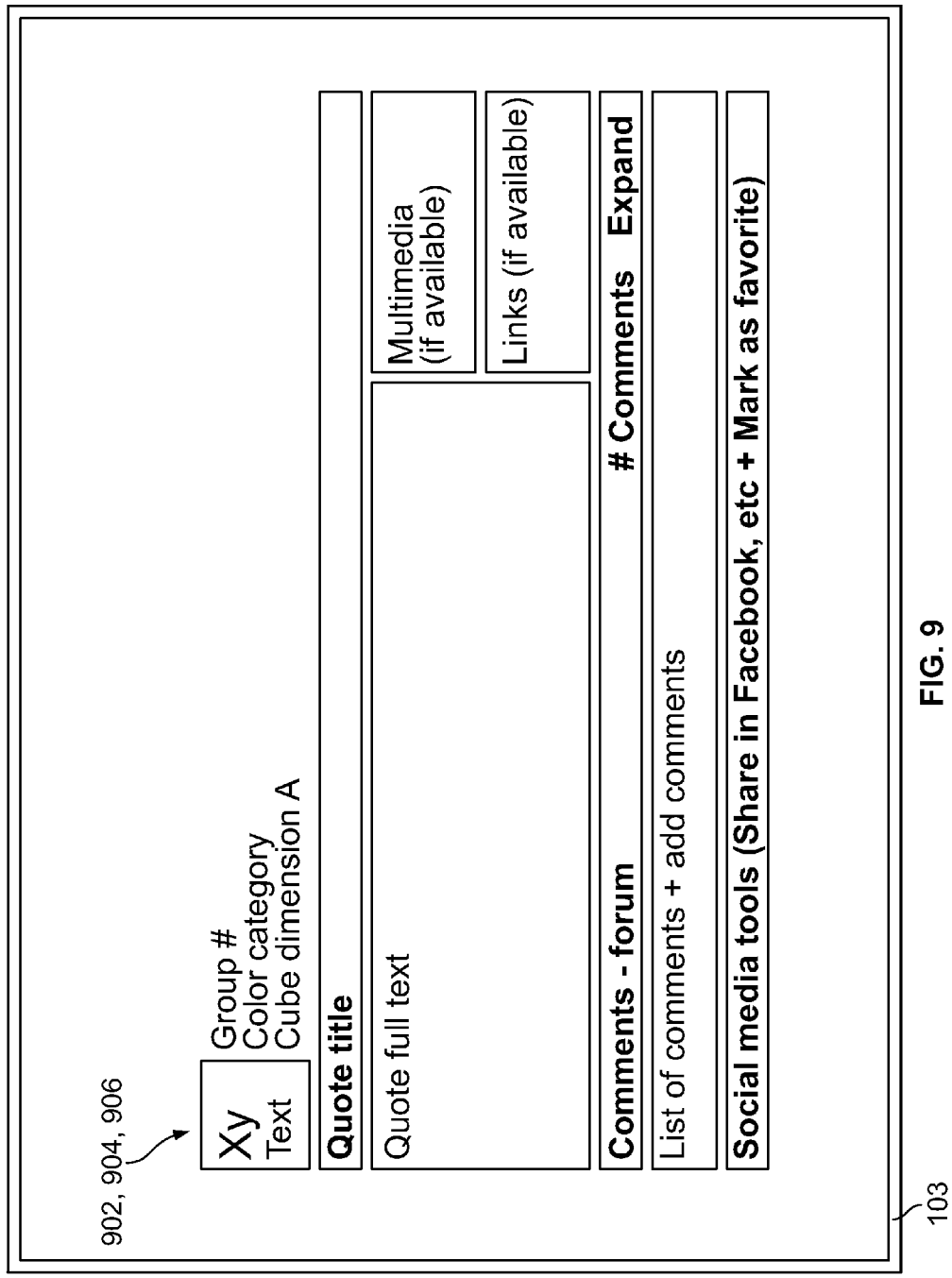
FIGS. 9-10 illustrate web pages showing additional information at a fifth hierarchal level of an element, according to exemplary embodiments of the present invention.
Figure 10:
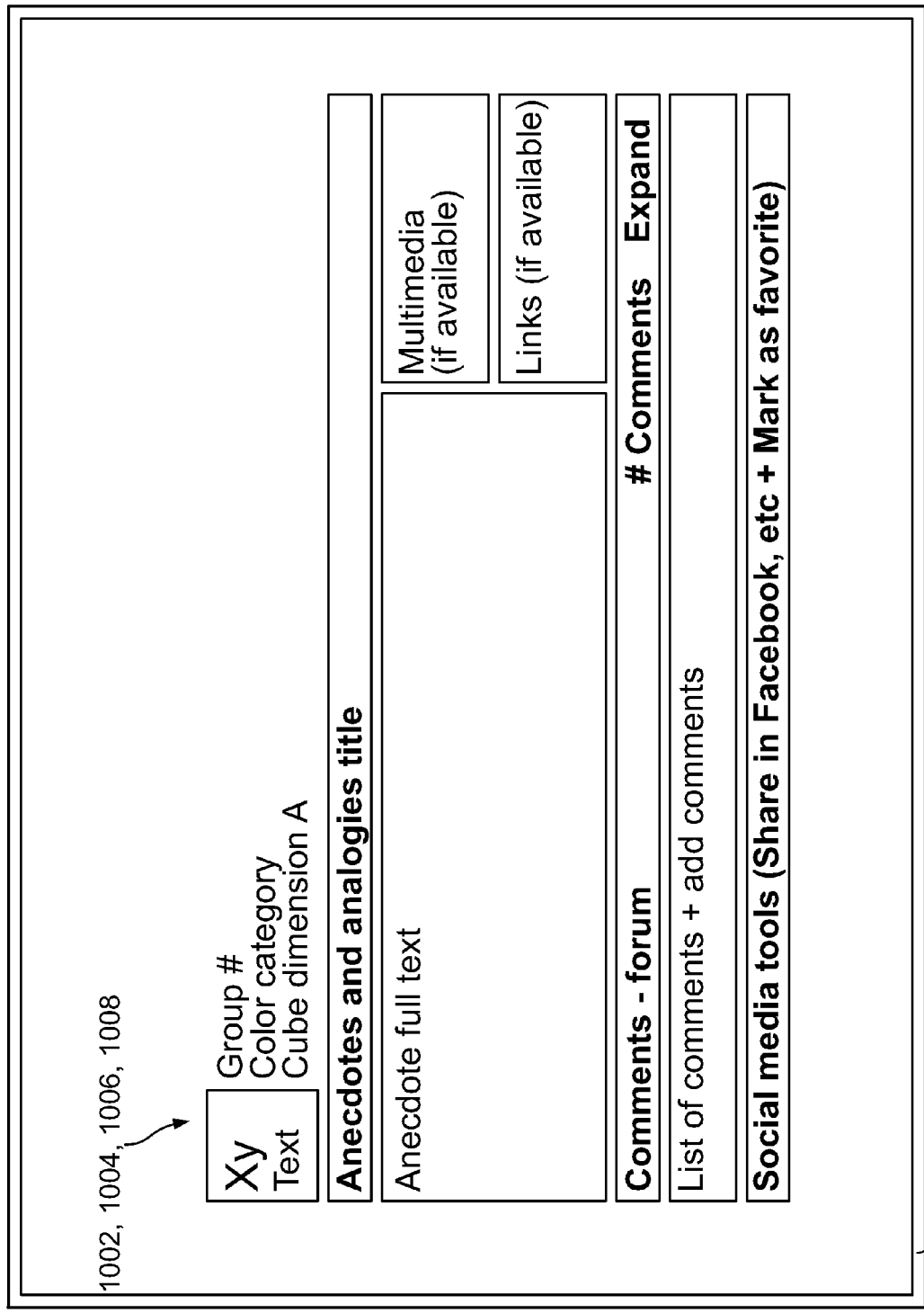
Figure 13A:
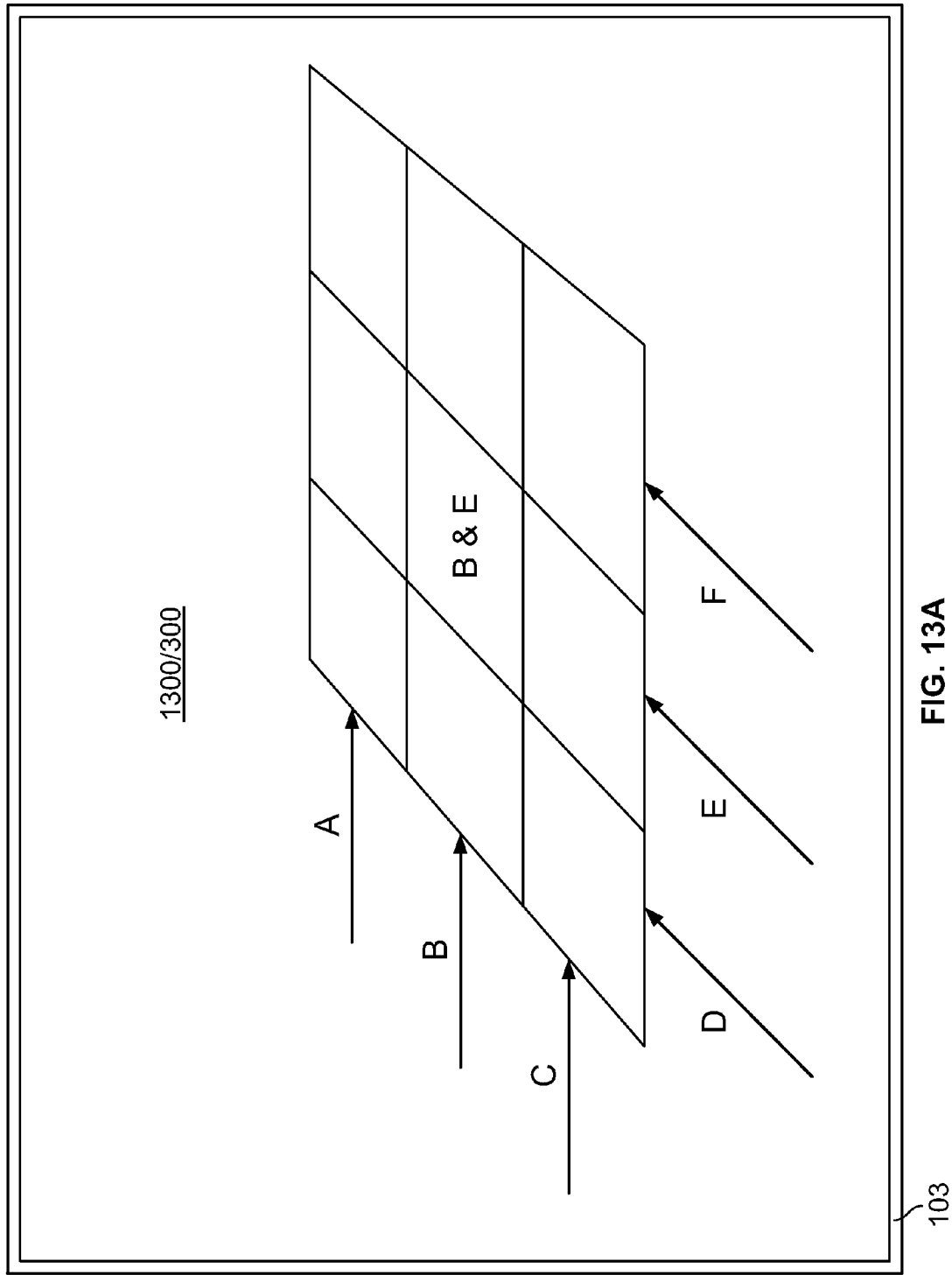
FIGS. 13A-14B illustrate navigational maps, according to exemplary embodiments of the present invention.
Figure 13B:
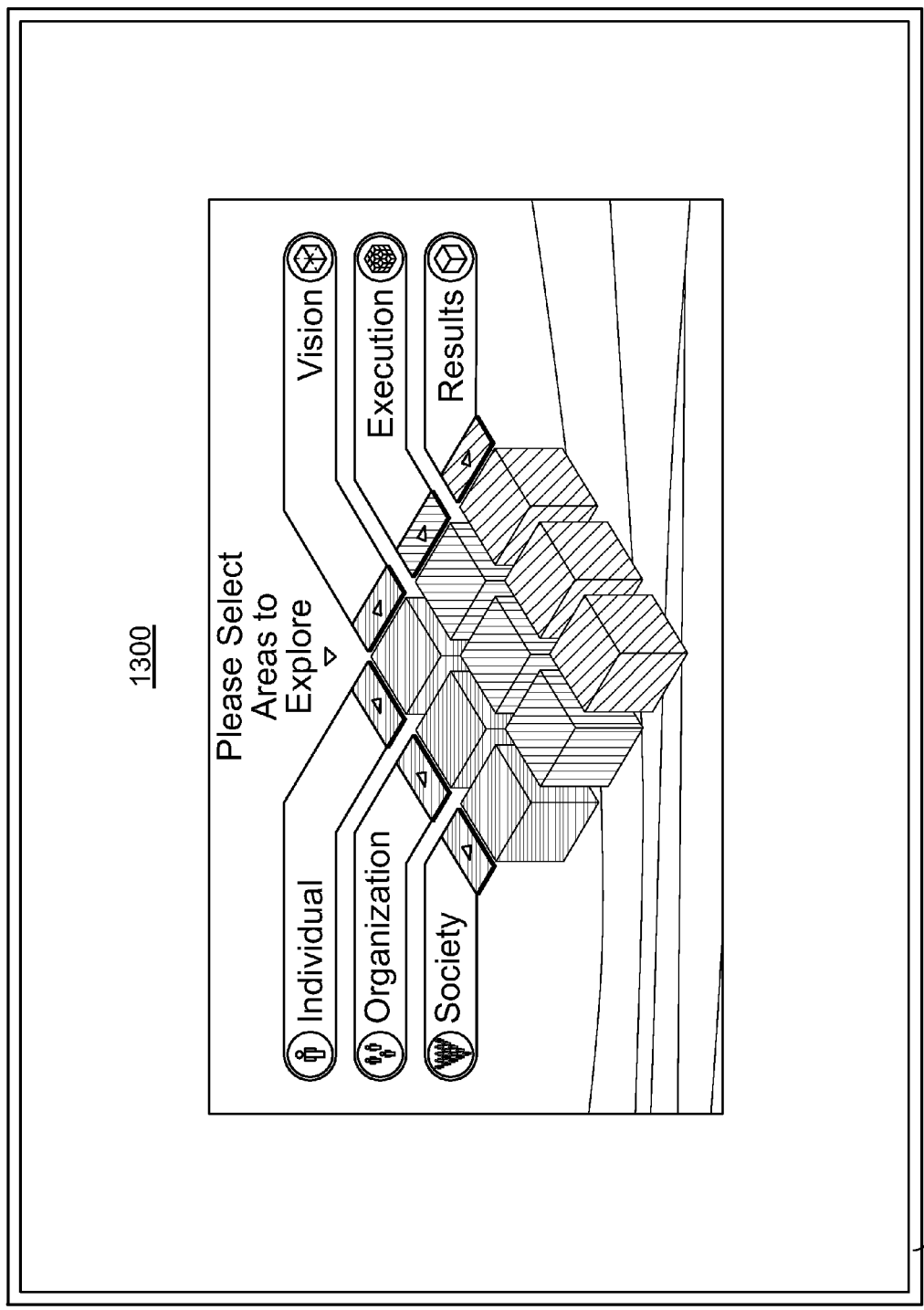
Figure 13C:
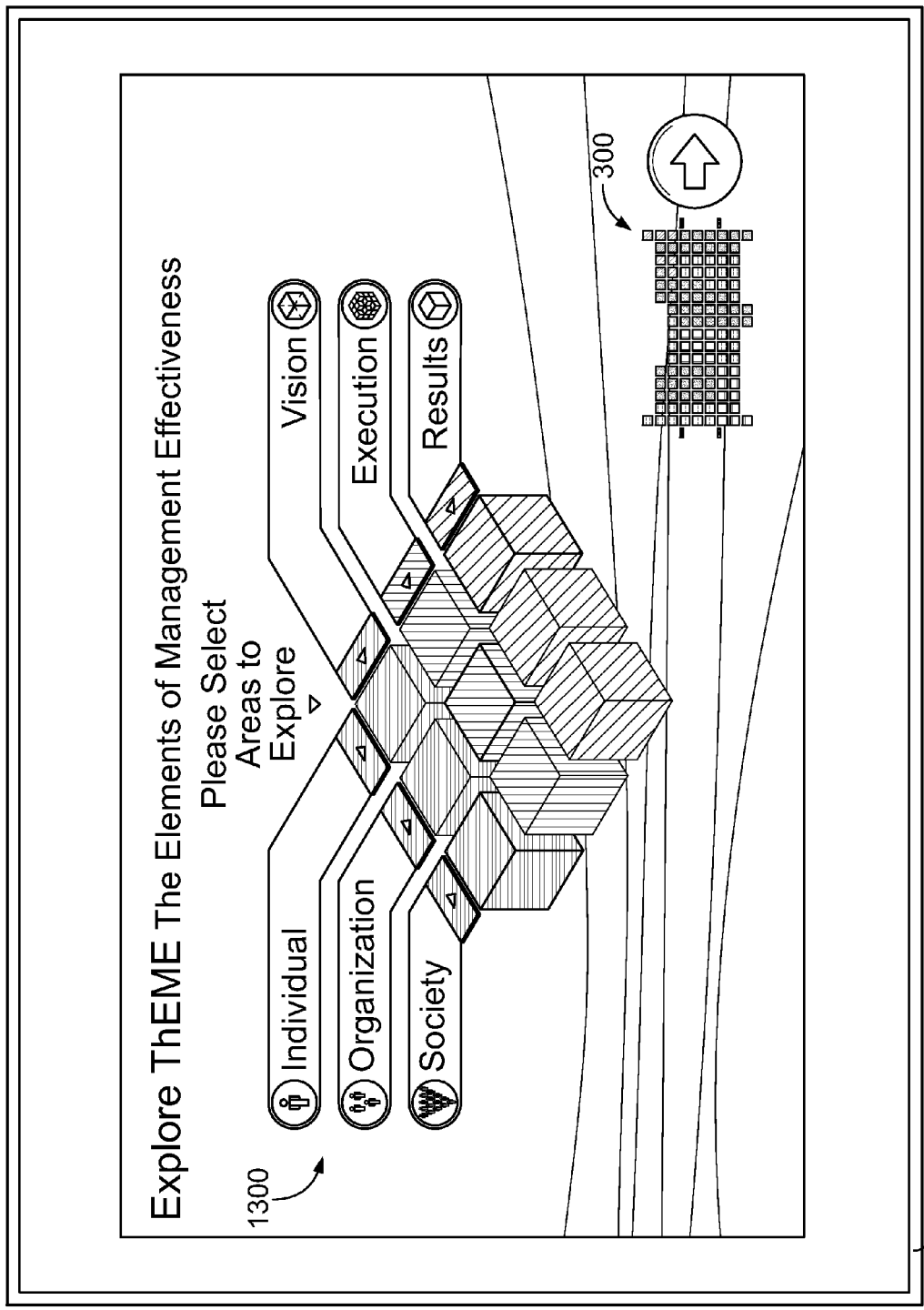
Figure 14A:
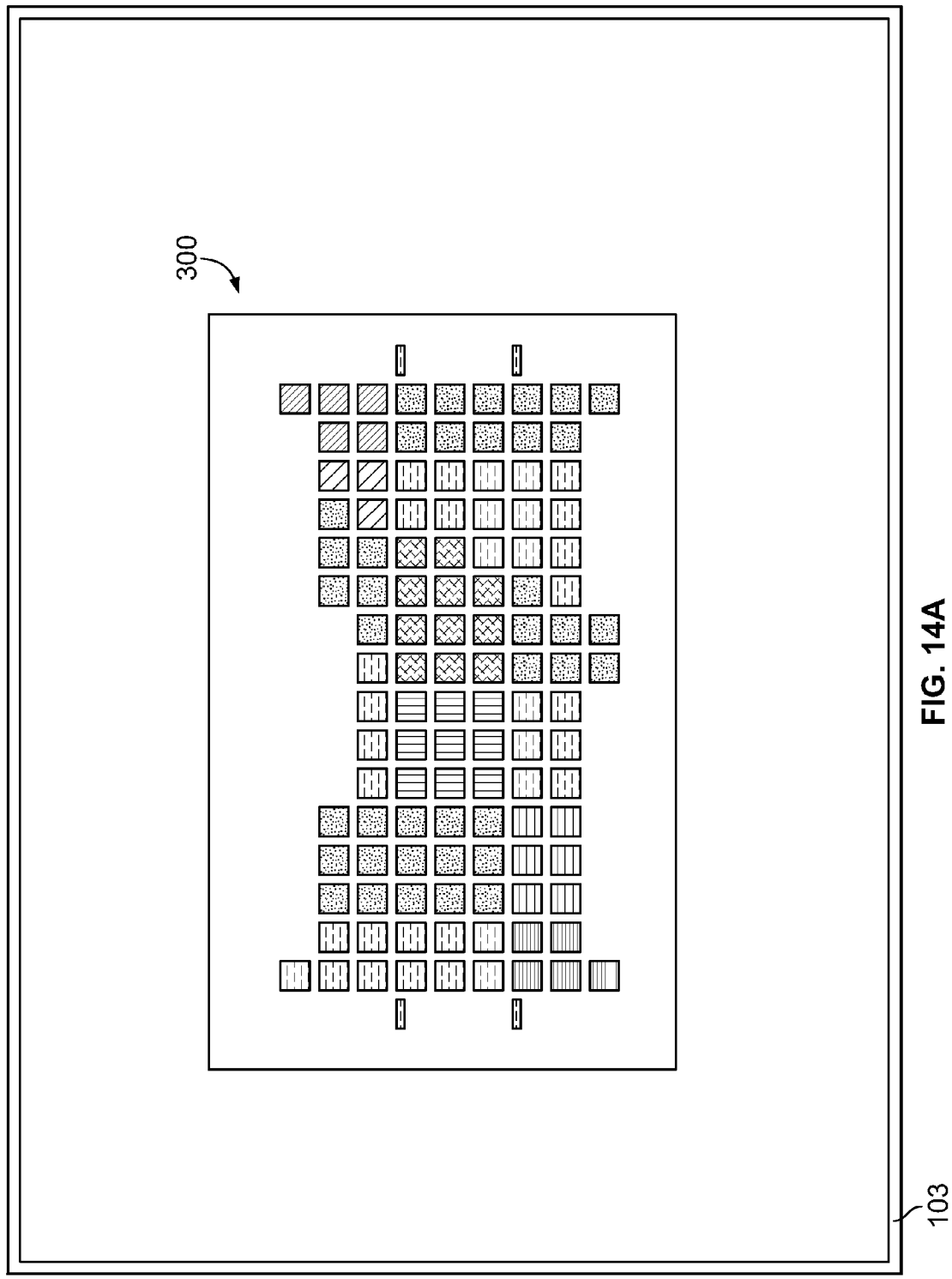
Figure 14B:
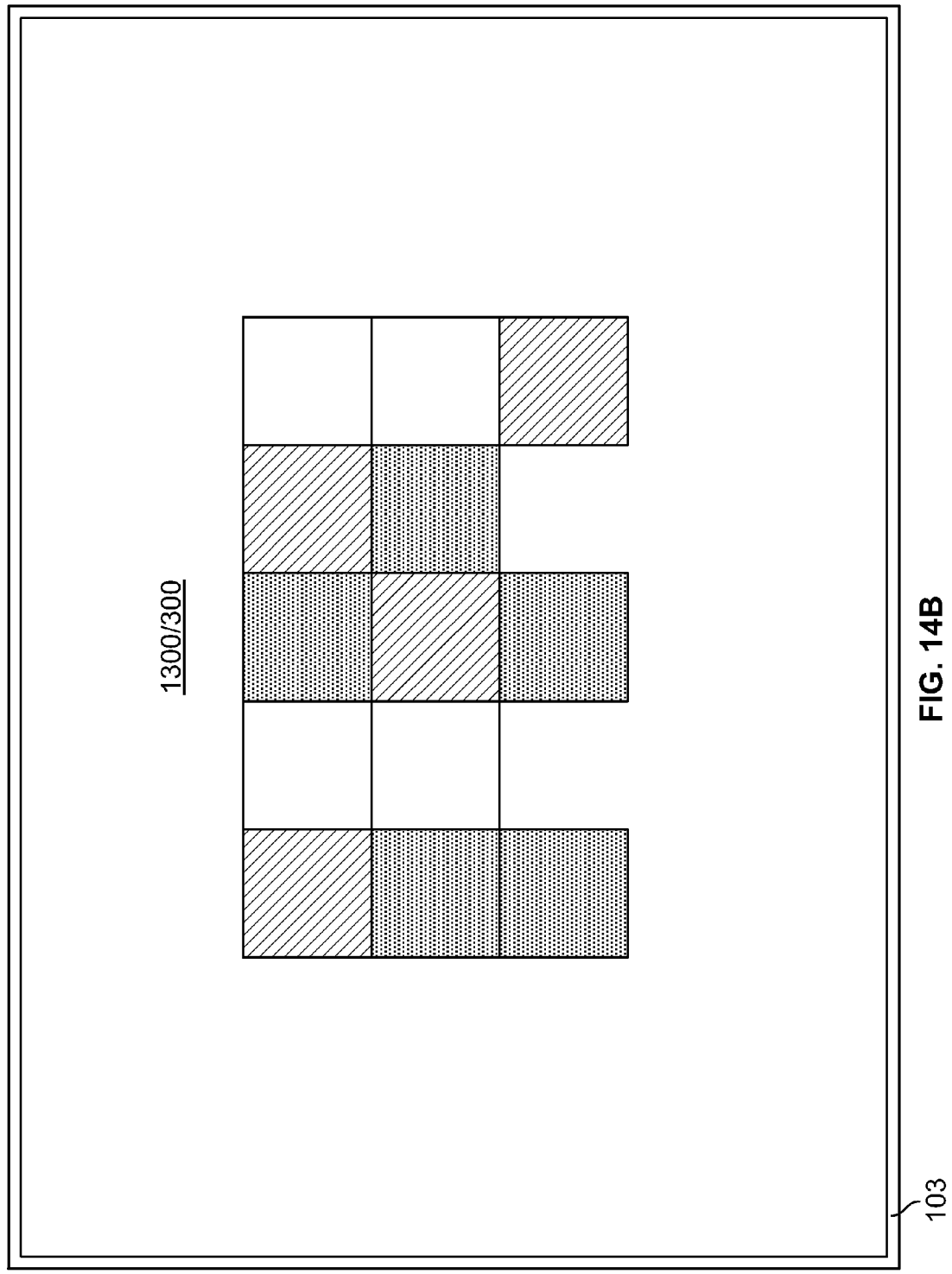

Referring to FIGS. 7-8, when an element 302 is selected, such as, for example, by clicking a cell, mousing over a cell or touching a cell on a touch screen, one or more details for the selected element at a third hierarchal level may be displayed, for example, in the graphical user interface 103 of the computerized user system and/or the computerized management system. For example, the details may be displayed in an animation, a pop-up window, a separate webpage, to name a few. In some exemplary embodiments, the display of the details may include one or more cells which each display one or more of the details of the selected element 302 of the management system, such as a three-dimensional cube of six square cells unfolded into a two-dimensional plane.

For example, the details at the third hierarchal level may comprise insights 702, anecdotes 704, and challenges and/or tools 706 from the management system, as well as other intro 703, audit 705, and exercises 707 from sources inside and/or outside the management system that can be updated for present or future relevance. Further, intro 703 can include multimedia that, amongst other things, displays information about that specific element. The one or more cells may also include more specific items of information for each detail at a fourth hierarchal level, such as quotes 802 and listings 804 from the management system, outside quotes 808 and listings 812 from other sources that can be updated for present or future relevance, inside quotes 810 and listings 814, practice tools 816, and self-auditing tools 818, to name a few.

Referring to FIGS. 9-12, each of the more specific items of information may provide a link to an animation, a pop-up window, or a separate webpage providing additional information at a fifth hierarchal level 902, 1002, 904, 906, 1004, 1006, 1008, 1102, 1202 such as the full text of quote or anecdote from the management system on the selected item, publications, speeches, case studies, multimedia/video, sources, user generated content, user or editorial comments, social media links or widgets, links to other websites or blogs, practice techniques and exercises, self-auditing tools, to name a few, for example, in the graphical user interface 103 of the computerized user system and/or the computerized management system. In embodiments, the information can include third party materials, for example, materials from the Aspen Institute Ethical Assessment and Trust Unlimited's Audit, to name a few.

In some embodiments, the system may include additional mechanisms for prioritizing the information for relevance and/or policing the information for accuracy, for example, such as a CEO's priorities inside an organization. The information can be stored in databases stored in processor readable memory, accessed using at least one processor, selected information can be populated in at least one display. For example, the details and information shown may be determined by various logic factors, such as frequency of look up, source, date of most recent source, date of last quote in blog, media type, fit with user's profile, test sample, rating, number of comments, visitor feedback, priority assigned, to name a few. The system may accuracy of the information may be controlled through editorial review of the information by the administrators, contributors, and/or users of the system. However, in other embodiments, the accuracy and relevance of the details and more specific information may rely on the accountability contributors and/or users without additional policing or prioritization mechanisms.

Referring to FIGS. 11-12, a practice tool and a self-auditing tool are shown according to exemplary embodiments of the present invention, respectively, for example, in the graphical user interface 103 of the computerized user system and/or the computerized management system. Practice tools can allow users to practice applying the concepts of each element of the management system to reinforce to understanding and facilitate improvement of management skills. Self-auditing tools provide evaluation and scoring mechanisms that allow for assessment of management effectiveness for individuals, groups, or organizations and identification, and for identification of areas of proficiency and inadequacy. In exemplary embodiments, the self-auditing tool can be scored based on user specific feedback, enterprise-specific value statements, interaction, and tracking.

The data generated from these tools may be contained locally, provided to the system administrators, shared between individuals, groups or organizations, and/or shared openly across the system. By way of example, information may be shared through online or in-person classes, networking between individuals or groups, intra-organizational networking, inter-organizational networking, to name a few. The data may be analyzed to identify local or larger-scale management tendencies, which may allow for the creation and implementation of new techniques for improving management effectiveness in the identified areas.

Further, at least one processor readable memory 109 and 109' and/or the at least one database 120 and 120' stored in processor readable memory can store the information regarding the groups 402 and 502 to which each element 302 is assigned at the first hierarchal level; the general information 602, 604, and 606 for each element at the second hierarchal level; the one or more details 702, 704, 706, 703, 705, 707 for each element at the third hierarchal level; the more specific information 802, 804, 806, 808, 810, 812, 814, 816, and 818 at the fourth hierarchal level; and the additional information 902, 1002, 904, 906, 1004, 1006, 1008, 1102, 1202 at the fifth hierarchal level.

For example, at least one processor readable memory 109 and 109' and/or the at least one database 120 and 120' stored in processor readable memory can store information, such as, but not limited to, (i) electronic source-content information including information representing at least some content information from at least one source; (ii) electronic source-element information including information representing at least one element, that can be associated with at least some information from at least one source; (iii) electronic source-hierarchal information including information representing at least one hierarchal structure level, that can be associated with at least one element, that can be associated, with at least some information from and at least one source; any further combination or separation thereof; and/or any other information. Further, any of the information, stored at least one processor readable memory 109 and 109' and/or the at least one database 120 and 120' stored in processor readable memory, can be associating, by processor(s), with element(s), hierarchal level(s), group(s), any further combination or separation thereof, and/or any other aspect of the visualization structure. These associations can allow information to be transmitted in response to requests from a first higher hierarchal level and/or navigable to information at a lower hierarchal level and/or transmitted in response to requests at various hierarchal levels.

A navigational map, as described in greater detail below, can allow the user to navigate through the hierarchal levels of the table stored within the at least one processor readable memory 109 and 109' and/or the at least database 120 and 120'. The graphical user interface 103 and 103' can provide a graphical display of the table and the available hierarchal options for navigation. The user at the computerized user system can connect to computerized management system 110, for example, directly, through the network, or over the network 140, for example, the Internet, to access the table and to access a hierarchal structure may entail a user selecting an object a higher level to navigate to information at a lower level. Further, it may be necessary for the user to return to the higher level before moving laterally for selection of another object at that level.

In exemplary embodiments, by way of example, referring back to FIG. 3, the management system may be based on the management theories developed in the works of Peter F. Drucker, stored in at least one database in processor readable memory that when selected can be accessed by at least one processor and populated and/or generated in at least one display. Of course, the management system may be include based on any management theories developed individuals, corporations, holding companies, and/or investment firms, to name a few. In embodiments, the user may access the "collective intelligence" of the multitude of sources and practices. For example the management system may include be based on any management theories developed by individuals such as, but not limited, to Peter F. Drucker, Warren Bennis, Roger Martin, and Jim Collins, to name a few, or the history of individual enterprises such as DHL and RIM, to name a few. For ease, at times, only the teachings of Peter F. Drucker are mentioned. This is merely for ease and is in no way meant to be a limitation.

By way of example, the elements 302 of effective management from a system based on the management theories of Peter F. Drucker (a Drucker management system) can be populated in the various cells of the table 300. Following this example, the elements 302, as shown, are arranged horizontally in the table 300 according to a first set of groups 402 for a first metric defined as the key success factors, such as enterprising lens 303, theory of the enterprise and vision 305, shared culture 307, results-driving practices 309, meaningful results 311, a legacy of societal betterment 313. Further, the elements 302 are also arranged vertically in the table 300 according to a second set of groups 502 for second metric defined as groups of people, such as individuals 315, organizations 317, and the greater global society 319.

When a cell is selected, the details of the selected element 302 can be displayed and/or generated including insights 702, anecdotes 704, and challenges and tools 706 which may include, for example, the Drucker management system as well as outside materials as well as a proprietary auditing process, practice exercises, checklists, and individual, to name a few or enterprise specific comments and materials, to name a few. The one or more cells may also include more specific items of information for each detail, such as quotes 802 and listings 804 from the Drucker management system, as well as outside quotes and listings 808 and 810, inside quotes and listings 810 and 814, practice tools 816, self-auditing tools 818, and interactive auditing 806, to name a few. For example, quotes may be used to help understand the meaning of an element and facilitate thinking Anecdotes or stories may be used to further understanding by providing hypothetical and real world examples. Practice tools may reinforce understanding by allowing a user or group to practice applying the concepts of each element. Self-auditing tools may help raise awareness of a user's own management effectiveness as well as an organization's. In embodiments, practice tools may be customized and used to continue effective practices. When one of the details or more specific items of information for an element 302 is selected, additional information 902, 1002, 904, 1202, 906, 1004, 1006, 1008, 1102 regarding the selected detail of the element 302 is provided.

Referring to FIGS. 13A-13C & 14A-14B, in exemplary embodiments, the table can include a navigational map. This navigational map can be used for showing where and/or what level the user has navigated to in the table. For example, the navigational map can be generated and/or modified in response to a user's interaction with the hierarchal visualization structure, for example, in the graphical user interface 103 of the computerized user system and/or the computerized management system. Similar to the visualization structure, this navigational map can include elements, groups, and/or hierarchal structure levels. Further, as discussed below in more detail, the navigational map can generate and/or populate information at various hierarchical levels, elements, and/or groupings. Further still, the navigational map can, as discussed below, be used to assist in providing a simplified, condensed, and/or lesser detailed amount of information than the visualization structure. Even Further, the navigation map can, as discussed below, be used to generate and/or populate the visualization structure and/or adapt with additional information.

Further, colors and/or shades in a different color or tone can be used to assist in using the navigational map and/or visualization structure. For example, certain colors or shading in the navigational map when selected can cause other colors and/or shading in the visualization structure to appear.

Figure 15:
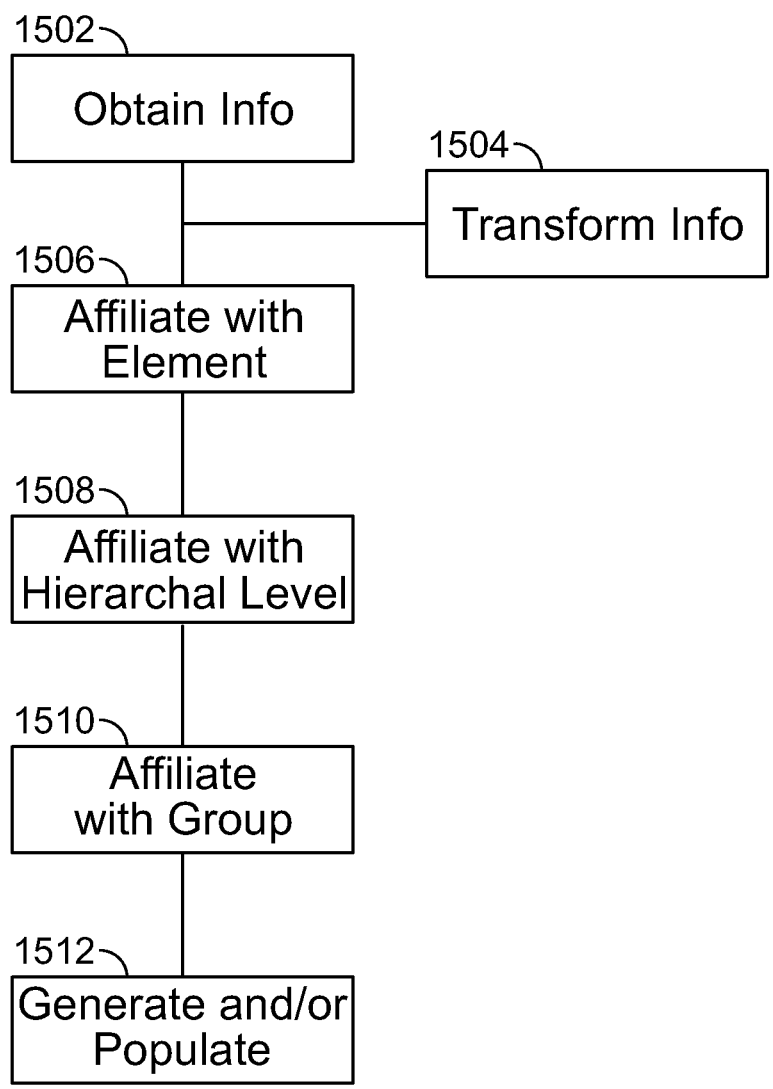
FIG. 15 is a flow chart illustrating exemplary methods for the methods discussed herein according to exemplary embodiments of the present invention.

Referring to FIG. 15, in exemplary embodiments, a flow chart illustrates at least some of the steps that can be used to generate and/or update the hierarchal visualization structure. At step 1502, the computerized management system 110 can obtain information from a plurality of sources. For example, the computerized management system 110 can obtain information, via a communication portal, from a user, via computerized user system 130 communicating through network 140. Management system 100 can also obtain information from a user, via a user input, a graphical user interface, a combined user input and graphical user interface, and/or via a communication portal.

Further, in exemplary embodiment, computerized management system 110 can implement some, if not all, steps to obtain information, such that information can be obtained passively, actively, and/or any combination thereof. By way of example, computerized management system 110 can implement some, if not all, of the steps to open a communication portal and implement some, if not all, of the steps to activate or allow access to a user input and/or a graphical user interface such that information can be passively obtained from a user inputting information to computerized management system 110, via a communication portal, a user input, a graphical user interface, a combined user input and graphical user interface, and/or any other technique for passively obtaining information.

Further, in exemplary embodiments, computerized management system 110 can implement, using a processor, some, if not all, steps such that information can be actively obtained. For example, computerized management system 110 can implement, using a processor, some, if not all, steps to access an algorithm, program, and/or process stored in processor readable memory to allow communication via a communication portal, such that computerized management system 110 can actively access a private and/or a public network to obtain information by, for example, searching for it. To actively obtain information computerized management system 110 can implement, using a processor, some, if not all, steps for a web crawler, ant, automatic indexer, bot, web spider, web robot, web scutter, data miner, data dredger, and/or any other technique that can browse a network and/or system in a methodical, automated manner and/or in an orderly fashion, to, for example, parse information thereby obtaining desired information.

In exemplary embodiments, at optional step 1504, management system 100 can implement, using a processor, some, if not all, steps that can transform the obtained information. For example, to transfer information, computerized management system 110 can include an application programming interface ("API"). This API can be an interface implemented by an algorithm, program, and/or process, stored in processor readable memory that can be accessed and processed by a processor, enabling management system 100 to implement some, if not all, steps to interact with various other forms of software and/or processes. Further, example, computerized management system 110 can implement, using a processor, some, if not all, the steps in this API stored in processor readable memory, to facilitate interaction, via communication portal, between different software programs and processes.

Further, at optional step 1504, the management system can transform the obtained information by parsing, analyzing, and/or affiliating, various parts of it. For example, information can be from a substantially large source that can include various aspects which can relate to various elements and/or various hierarchal structure levels. By way of example, the information source can be from a library, a book, a book service, a magazine, a magazine service, a video, and/or some other substantially large source of information. The system can obtain the information from this large source and can transform it such that only some of the large source can be affiliated with at least an element, group, hierarchal level, etc. As a more specific example, the system can actively and/or passively obtain a volume of books by Peter F. Drucker, parse the information in the volume of books, and have a quote from one of the book affiliated with an element, group, hierarchal level, etc.

At step 1506, the information can be affiliated with elements in the visualization structure passively, actively, and/or any combination thereof. For example, management system 100 can implement some, if not all, of the steps to match information and/or transformed information with elements based on common characteristics. For example, information obtained and/or transformed can be actively and/or passively affiliated with at least an element because, for example, elements can be assigned affiliation characteristics such as, but not limited to, key words, phrases, and/or some other affiliation characteristic. By way of example, a user can affiliate the obtained information and/or transformed information by affiliating it with at least one element based on the affiliation characteristics. By way of another example, the system can affiliate the obtained information an/or transformed information based on the affiliation characteristics.

At step 1508, the information and/or transformed information can be affiliated with hierarchal structure levels that are affiliated with elements used in a visualization structure passively, actively, and/or any combination thereof. For example, management system 100 can implement some, if not all, of the steps to match the information and/or transformed information with at least one hierarchal structure level based on common characteristics. For example, information obtained and/or transformed can be actively and/or passively affiliated with at least a hierarchal structure level because, for example, hierarchal structure levels can be assigned affiliation characteristics such as, but not limited to, key words, phrases, and/or some other affiliation characteristic. By way of example, a user can affiliate the obtained information and/or transformed information by affiliating it with at least one hierarchal structure level based on the affiliation characteristics. By way of another example, the system can affiliate the obtained information an/or transformed information based on the affiliation characteristics.

At step 1510, in exemplary embodiments, management system 100, can implement some, if not all, of the steps to affiliate information and/or transformed information, a plurality of elements, and/or hierarchal structure levels into groups passively, actively, and/or any combination thereof. Further, groups may be related to other groups passively, actively, and/or any combination thereof. In exemplary embodiments, these affiliations of elements information and/or transformed information, hierarchal levels, and/or groups can be arranged in the visualization structure such that they can collectively constitute a common theme. By way of example, a visualization structure of a management effective map can put elements and/or groups together such that they can collectively constitute the underpinning of management effectiveness, tailored as appropriate for self-management, organizational management, and management of society throughout the repeating cycle of vision, execution, and outcome of management.

For example, information obtained and/or transformed actively and/or passively can be actively and/or passively affiliated with at least one group because, for example, groups can be assigned affiliation characteristics such as, but not limited to, key words, phrases, and/or some other affiliation characteristic. By way of example, a user can affiliate the obtained information and/or transformed information by affiliating it with at least one group based on the affiliation characteristics. By way of another example, the system can affiliate the obtained information an/or transformed information based on the affiliation characteristics.

At step 1512, management system 100 can utilize each of the affiliations and/or groups to generate the visualization structure and/or populate a visualization structure. That is, in exemplary embodiments, management system 100 can implement some, if not all, of the steps to generate a visualization structure and/or populate a visualization structure's fields. In exemplary embodiments, the visualization structure can be organized in a tabular form denoting various elements of a management system.

Further, management system 100 can be affiliated with and/or include a software platform for collaboration and web publishing combined under a single server. This software platform can include capabilities for developing web sites, portals, intranets, content management systems, search engines, wikis, blogs, and other tools for management system 100. For example, management system 100 can be affiliated with and/or include Microsoft SharePoint. Utilizing this software platform and/or the visualization structure users can be provided with substantially convenient access to and/or classification of new and existing management theories and techniques.

It will be understood that the visualization structure can be any tabular form such as, but not limited to, a periodic table, a two dimensional table, a multi-dimensional table, a table with rows, columns, and/or elements, any combination thereof, and/or any tabular form. For ease, at times, the visualization structure is described as being in the form of a periodic table. This is merely for ease and is in no way meant to be a limitation.

It will be understood that obtaining information at step 1502; transforming information at optional step 1504; affiliating at steps 1506, 1508, and 1510; and/or generating, and/or populating at step 1512, can be further combined, separated, and/or implemented in any order. Management system 100 can implement some, if not all of, the steps to actively and/or passively obtain, transform, affiliate, group and/or generate and/or populate the hierarchal visualization structure. For example, management system 100 can implement some, if not all, of the steps to obtain and/or transform information using a website parse template and a distributed web crawling system. As another example, management system 110 can actively obtain a source of information, actively convert the obtained information format to run on a different platform, and/or, a user can passively enter some information into an element, assign it to a hierarchal level, group, etc. Of course, other variations of actively and passively obtaining, transforming, affiliating, grouping, and/or generating and/or populating the hierarchal visualization structure can be used. For ease, only some variations are described. This is merely for ease and is in no way meant to be a limitation.

Figure 16:
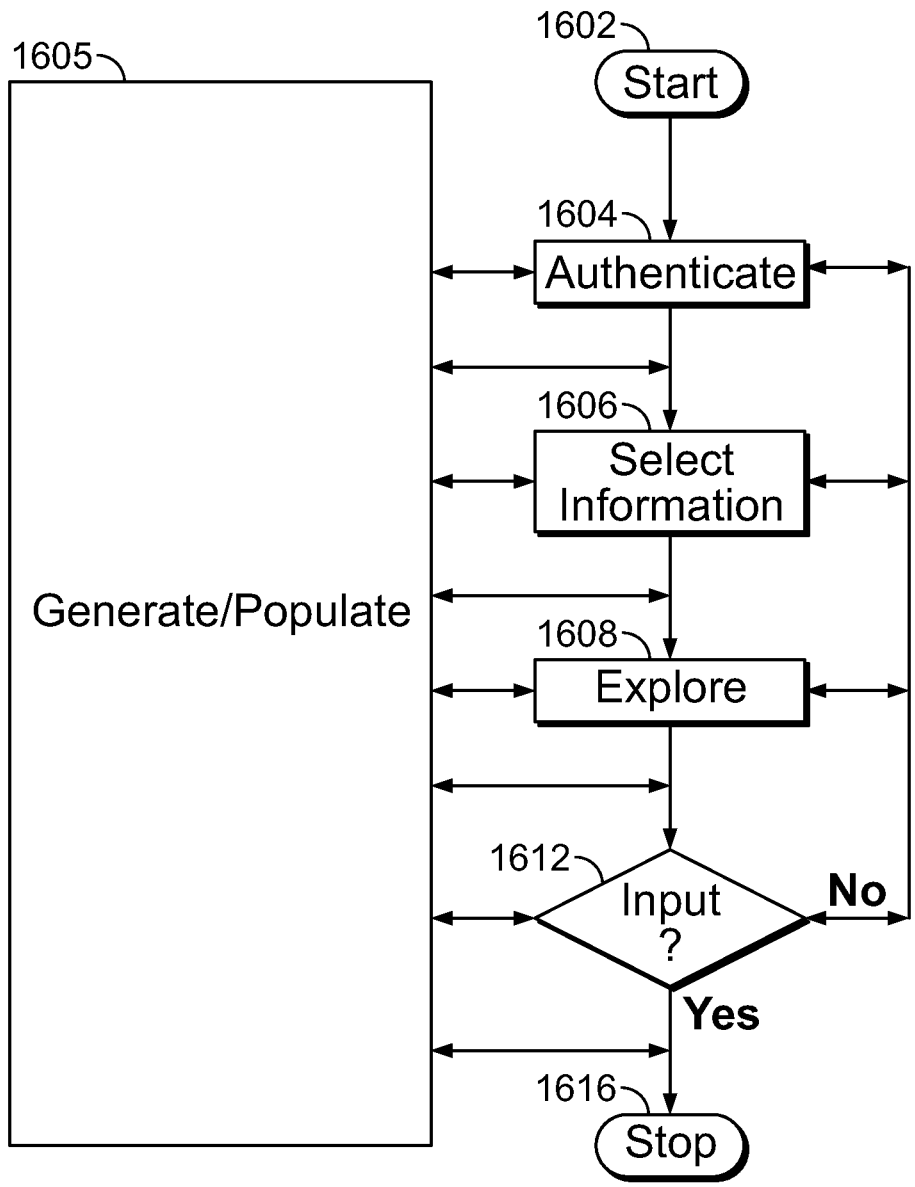
FIG. 16 is a flow chart illustrating exemplary methods for the methods discussed herein according to exemplary embodiments of the present invention.

Referring FIG. 16, in exemplary embodiments, depicts an exemplary flowchart for, inter alia, a user's interactions with the systems and methods. By way of example, as discussed herein, a user can access the visualization structure and information can be provided, input, and/or accessed, etc. from, for example, various elements, groupings, etc. at various hierarchal levels. As discussed, more detailed information can be provided as a user moves through various hierarchal levels. Further, a navigational map can be provided to assist a user in determining their location with the visualization structure, hierarchal levels, and/or other location based information, to name a few.

By way of another example, the visualization structure and navigational map can be related such that the navigational map can be utilized relative to location information within the visualization structure, hierarchal levels, and/or other location based information, to name a few. For example, a user can access the visualization structure and have the navigational map assist in providing location information in the visualization structure, hierarchal levels, and/or other location based information, to name a few. For another example, before accessing the visualization structure, a user can access the navigational map and this can be used to assist in providing location information in the visualization structure, hierarchal levels, and/or other location based information, to name a few.

By way of example, at step 1602, a user can access the system and methods as described herein and can then be authenticated at step 1604. Authentication of a user can be based on predetermined variables such as, but not limited to, demographic information, user input data, historical usage information, additional statistical information, and/or any other reasonable source of information for authenticating a user. Further, authentication of a user can produced based on predetermined variables such as, but not limited to, demographic information, user input data, historical usage information, additional statistical information, and/or any other reasonable source of information for authenticating a user. etc.

As a more specific example, at authentication step 1604, a user can be authenticated by inputting information about them such as age, career, areas of interest, etc.; a user can be authenticated based on information input and/or produced on, for example, historical usage information, as discussed; and/or this information can be stored and/or used to generate a visualization structure and/or navigational map, at step 1605. Still further, either the visualization structure and/or the navigational map can provide historical, behavioral, demographic, information related to the user interaction with the system, and/or any other form of information.

It will be understood that at any of the steps in the method and/or combination of steps, and/or between steps the visualization structure and/or navigational map can be generated and/or populated at step 1605. For ease, only at some steps is this described. This is merely for ease and is in no way meant to be a limitation.

At step 1606 a user can select information from either the visualization structure and/or navigational map and/or search and/or browse for information. For example, as described above, a user can access the visualization structure at various hierarchical levels and select information. For another example, the user can select information from the navigational map and access the visualization structure at various hierarchical levels and select information. For yet another example, the user can select information from a search and/or browse feature and use that to access either the visualization structure and/or navigational map.

At step 1608, the user can explore the visualization structure and/or navigational map and/or search and/or browse for information at various elements, groupings, etc. at various hierarchal levels. For example, as described above, the user can explore through visualization structure moving through various elements, groupings, etc. at various hierarchal levels. For another example, the user can explore through the navigational map and/or this exploration can cause the navigational map to generate and/or populate information at various hierarchical levels. For yet another example, the user can explore through the navigational map and/or visualization structure and this exploration can cause the navigational map and/or visualization structure to generate and/or populate information at various hierarchical levels.

At step 1612, the user can input information to the system in the any of the elements, groupings, hierarchical levels, and/or any other input location as discussed. Of course, at any point the user can continue selecting, exploring, and/or inputting information prior to quitting using the systems and/or methods, at step 1616. In embodiments, the material may also be tailored for an organization or group of users with specific anecdotes and enterprise specific materials.

Referring to FIG. 17, the visualization structure and/or navigational map can include other shapes as well as include any number of hierarchical levels, groups, element, Now that exemplary embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

What is claimed is:

1. A method comprising:

storing, on at least one processor readable memory operatively connected to at least one processor, at least one database comprising:

(i) electronic source-content information comprising information representing at least some content information from at least one source, the at least some content information relating to management effectiveness, (ii) electronic source-element information comprising information representing a plurality of elements, each element associated with at least some content information from at least one source, and (iii) electronic source-hierarchal information comprising information representing at least one hierarchal structure level, associated with each element, associated with at least some content information from at least one source;

associating in a management effectiveness map in a form of a navigational hierarchal visualization structure shaped similarly to Mendeleev's periodic table of the elements including at least one of rows and columns, irregular boundaries, and visual identifiers, by at least one processor, (i) the electronic source-content information, (ii) the electronic source-element information, and (iii) the electronic source-hierarchal information, such that information is provided from a first higher hierarchal level and navigable to information at a lower hierarchal level;

receiving, via at least one communication portal operatively connected to at least one processor, a first electronic request for information at the first hierarchal structure level from a computerized user system associated with a first user;

determining, by at least one processors, a first electronic response that is at least responsive to the first electronic request for information at the first hierarchal structure level, the first electronic response including a subset of the plurality of elements grouped according to an at least one metric that is arranged in the navigational hierarchal visualization structure, the at least one metric grouping the elements within at least one of a set of categories such that the elements are grouped (i) along the visualizations structure's vertical axis, (ii) along the visualizations structure's horizontal axis, and (iii) irregularly along the visualizations structure's vertical and horizontal axis;

transmitting, via at least one communication portal, the first electronic response to the computerized user system associated with the first user, the first electronic responses (i) populating and (ii) generating the navigational hierarchal visualization structure, on a display of the computerized user system associated with the first user, constructed of (i) the plurality of elements associated with the at least some electronic source-content, (ii) the plurality of hierarchal structure levels associated with the plurality of elements, associated, with the at least some electronic source-content and (iii) the subset of the plurality of elements highlighted within the plurality of elements; and wherein the navigational hierarchal visualization structure at any of the hierarchal structures, transmitted via at least one communication portal, includes a navigational map identifying a location of the source-element in the navigational hierarchal visualization structure shaped similarly to Mendeleev's periodic table.

2. The method of claim 1, wherein the navigational hierarchal visualization structure at the first hierarchal structure, transmitted via at least one communication portal, further comprises:

at least one of a practice support tool and a self-auditing support that is at least one of (i) displayed, in at least one graphical user interface, and (ii) generated, on at least one physical medium.

3. The method of claim 1, wherein the categories of the management system at the first hierarchal structure, transmitted via at least one communication portal, further comprises:

key success factors and particular levels of society.

4. The method of claim 1, wherein the method further comprises:

receiving, via at least one communication portal operatively connected to at least one processor, a second electronic request for information at a second hierarchal structure level from the computerized user system associated with the first user;

determining, by at least one processors, a second electronic response that is at least responsive to the second electronic request for information at the second hierarchal structure level; and transmitting, via at least one communication portal, the second electronic response to the computerized user system associated with the first user, the second electronic response including general identification information regarding the element at a second hierarchal level, the general identification information including at least one of a textual symbol, abbreviation, full name, and brief description representing the element.

5. The method of claim 4, wherein the method further comprises:

receiving, via at least one communication portal operatively connected to at least one processor, a third electronic request for information at a third hierarchal structure level from the computerized user system associated with the first user;

determining, by at least one processors, a third electronic response that is at least responsive to the third electronic request for information at the third hierarchal structure level; and transmitting, via at least one communication portal, the third electronic response to the computerized user system associated with the first user, the third electronic response including general identification information regarding each element at the third hierarchal level, wherein the same type of general identification information is provided for each element.

6. The method of claim 5, wherein the method further comprises:

receiving, via at least one communication portal operatively connected to at least one processor, a fourth electronic request for information at a fourth hierarchal structure level from the computerized user system associated with the first user;

determining, by at least one processors, a fourth electronic response that is at least responsive to the fourth electronic request for information at the fourth hierarchal structure level; and transmitting, via the at least one communication devices, the fourth electronic response to the computerized user system associated with the first user, the fourth electronic response including more specific information regarding each detail stored at a fourth hierarchal level.

7. The method of claim 6, wherein the method further comprises:

receiving, via at least one communication portal operatively connected to at least one processor, a fifth electronic request for information at a fifth hierarchal structure level from the computerized user system associated with the first user;

determining, by at least one processors, a fifth electronic response that is at least responsive to the fifth electronic request for information at the fifth hierarchal structure level; and transmitting, via at least one communication portal, the fifth electronic response to the computerized user system associated with the first user, the fifth electronic response including the fifth electronic response including more specific information, the more specific information including at least one of quotes, listings, practice tools, and self-auditing tools, full text of quotes or anecdotes, publications, speeches, case studies, multimedia/video sources, user generated content, user or editorial comments, social media links or widgets, links to other websites or blogs, practice techniques and exercises, and self-auditing tools.

8. The method of claim 1, wherein at least one of a set of categories is of a management system.

9. The method of claim 1, wherein the electronic source-content information comprising information representing at least some content information from at least one source is obtained and affiliated passively by user input.

10. The method of claim 1, wherein the electronic source-content information comprising information representing at least some content information from at least one source is obtained actively by a computer implemented process.

11. The method of claim 1, wherein the electronic source-content information comprising information representing at least some content information from at least one source is affiliated actively by a computer implemented process.

12. A method comprising:
storing, on at least one processor readable memory operatively connected to at least one processor, at least one database comprising:
(i) electronic source-content information comprising information representing at least some content information from at least one source, the at least some content information relating to management effectiveness,
(ii) electronic source-element information comprising information representing a plurality of elements, each element associated with at least some content information from at least one source, and
(iii) electronic source-hierarchal information comprising information representing at least one hierarchal structure level, associated with at least one element, associated with at least some content information from at least one source;

associating in a management effectiveness map in a form of (a) a navigational hierarchal visualization structure and (b) navigational structure forming a table of the elements including at least one of rows and columns, irregular boundaries, and visual identifiers, by at least one processor, (i) the electronic source-content information, (ii) the electronic source-element information, and (iii) the electronic source-hierarchal information, such that information is provided from a first higher hierarchal level and navigable to information at a lower hierarchal level;

receiving, via at least one communication portal operatively connected to at least one processor, a first electronic request for information at the first hierarchal structure level from a computerized user system associated with a first user;

determining, by at least one processors, a first electronic response that is at least responsive to the first electronic request for information at the first hierarchal structure level, the first electronic response including a subset of the plurality of elements grouped according to an at least one metric that is arranged in (i) the navigational hierarchal visualization structure and (ii) the navigational structure, the at least one metric grouping the elements within at least one of a set of categories such that the elements are grouped (i) along (i) the navigational hierarchal visualization structure and (ii) the visualizations structure's vertical axis, (ii) along (i) the navigational hierarchal visualization structure and (ii) the visualizations structure's horizontal axis, and (iii) irregularly along (i) the navigational hierarchal visualization structure and (ii) the visualizations structure's vertical and horizontal axis;

transmitting, via at least one communication portal, the first electronic response to the computerized user system associated with the first user, the first electronic response (i) populating and (ii) generating (i) the navigational hierarchal visualization structure and (ii) the navigational structure, on a display of the computerized user system associated with the first user, constructed of (i) the plurality of elements associated with the at least some electronic source-content, (ii) the plurality of hierarchal structure levels associated with the plurality of elements, associated, with the at least some electronic source-content and (iii) the subset of the plurality of elements highlighted within the plurality of elements; and wherein the navigational hierarchal visualization structure at any of the hierarchal structures, transmitted via at least one communication portal, includes an at least one navigational map identifying a location of the source-element in the navigational hierarchal visualization structure shaped similarly to Mendeleev's periodic table.

13. The method of claim 12, wherein the navigational hierarchal visualization structure is shaped similarly to Mendeleev's periodic table.

14. The method of claim 12, wherein the navigational hierarchal visualization structure at the first hierarchal structure, transmitted via at least one communication portal, further comprises:
at least one of a practice support tool and a self-auditing support that is at least one of (i) displayed, in at least one graphical user interface, and (ii) generated, on at least one physical medium.

15. The method of claim 12, wherein the categories of the management system at the first hierarchal structure, transmitted via at least one communication portal, further comprises:
key success factors and particular levels of society.

16. The method of claim 12, wherein the method further comprises:
receiving, via at least one communication portal operatively connected to at least one processor, a second electronic request for information at a second hierarchal structure level from the computerized user system associated with the first user;

determining, by at least one processors, a second electronic response that is at least responsive to the second electronic request for information at the second hierarchal structure level; and transmitting, via at least one communication portal, the second electronic response to the computerized user system associated with the first user, the second electronic response including general identification information regarding the element at a second hierarchal level, the general identification information including at least one of a textual symbol, abbreviation, full name, and brief description representing the element.

17. The method of claim 16, wherein the method further comprises:
receiving, via at least one communication portal operatively connected to at least one processor, a third electronic request for information at a third hierarchal structure level from the computerized user system associated with the first user;
determining, by at least one processors, a third electronic response that is at least responsive to the third electronic request for information at the third hierarchal structure level; and
transmitting, via at least one communication portal, the third electronic response to the computerized user system associated with the first user, the third electronic response including general identification information regarding each element at the third hierarchal level, wherein the same type of general identification information is provided for each element.

18. The method of claim 17, wherein the method further comprises:
receiving, via at least one communication portal operatively connected to at least one processor, a fourth electronic request for information at a fourth hierarchal structure level from the computerized user system associated with the first user;
determining, by at least one processors, a fourth electronic response that is at least responsive to the fourth electronic request for information at the fourth hierarchal structure level; and
transmitting, via the at least one communication devices, the fourth electronic response to the computerized user system associated with the first user, the fourth electronic response including more specific information regarding each detail stored at a fourth hierarchal level.

19. The method of claim 18, wherein the method further comprises:
receiving, via at least one communication portal operatively connected to at least one processor, a fifth electronic request for information at a fifth hierarchal structure level from the computerized user system associated with the first user;
determining, by at least one processors, a fifth electronic response that is at least responsive to the fifth electronic request for information at the fifth hierarchal structure level; and
transmitting, via at least one communication portal, the fifth electronic response to the computerized user system associated with the first user, the fifth electronic response including the fifth electronic response including more specific information, the more specific information including at least one of quotes, listings, practice tools, and self-auditing tools, full text of quotes or anecdotes, publications, speeches, case studies, multimedia/video sources, user generated content, user or editorial comments, social media links or widgets, links to other websites or blogs, practice techniques and exercises, and self-auditing tools.

20. The method of claim 12, wherein at least one of a set of categories is of a management system.

21. The method of claim 12, wherein the electronic source-content information comprising information representing at least some content information from at least one source is obtained and affiliated passively by user input.

22. The method of claim 12, wherein the electronic source-content information comprising information representing at least some content information from at least one source is obtained actively by a computer implemented process.

23. The method of claim 12, wherein the electronic source-content information comprising information representing at least some content information from at least one source is affiliated actively by a computer implemented process.

* * * * *